(12) United States Patent  
Enis et al.

(10) Patent No.: US 8,024,928 B2  
(45) Date of Patent: Sep. 27, 2011

(54) METHOD AND APPARATUS FOR USING SOLAR ENERGY TO ENHANCE THE OPERATION OF A COMPRESSED AIR ENERGY STORAGE SYSTEM

(76) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 426 days.

(21) Appl. No.: 12/321,794

(22) Filed: Jan. 26, 2009

(65) Prior Publication Data

US 2009/0230696 A1    Sep. 17, 2009

Related U.S. Application Data

(60) Provisional application No. 61/062,149, filed on Jan. 24, 2008, provisional application No. 61/068,170, filed on Mar. 5, 2008, provisional application No. 61/195,418, filed on Oct. 7, 2008.

(51) Int. Cl.
*B60K 16/00* (2006.01)
*B60L 8/00* (2006.01)
*F03G 6/00* (2006.01)
*F01K 1/00* (2006.01)
*F01K 3/00* (2006.01)

(52) U.S. Cl. .............. 60/641.14; 60/641.8; 60/659

(58) Field of Classification Search ........... 60/641.8, 60/641.12, 641.13, 641.14, 659; 165/81–83; 126/640–683

See application file for complete search history.

(56) References Cited

U.S. PATENT DOCUMENTS

| 3,991,741 | A |   | 11/1976 | Northrup et al. |
|---|---|---|---|---|
| 4,150,547 | A | * | 4/1979 | Hobson .......................... 60/659 |
| 4,199,952 | A |   | 4/1980 | Berg |
| 4,313,902 | A |   | 2/1982 | Lin et al. |
| 4,367,634 | A |   | 1/1983 | Bolton |
| 4,389,825 | A |   | 6/1983 | Chow |
| 4,479,336 | A |   | 10/1984 | Schoening et al. |
| 5,932,885 | A |   | 8/1999 | DeBellis et al. |
| 2007/0012041 | A1 |   | 1/2007 | Goldman |
| 2008/0000247 | A1 |   | 1/2008 | Sinha et al. |

\* cited by examiner

*Primary Examiner* — Thomas Denion  
*Assistant Examiner* — Christopher Jetton  
(74) *Attorney, Agent, or Firm* — J. John Shimazaki; Patent Office of J. John Shimazaki, PLLC

(57) ABSTRACT

The invention relates to a method and apparatus for using solar energy to enhance the efficiency of a compressed air energy storage system (and visa-versa). The apparatus comprises a photovoltaic panel to drive a compressor, which provides compressed air energy into an inner vessel housed within a storage tank. Two solar receiving panels are used to heat water which can be circulated and stored within an annulus surrounding the inner vessel, wherein the heated water can help regulate the temperature of the compressed air within the tank. This way, when air is released using a turbo expander, any excess temperature drops that can otherwise result from air expansion can be avoided. The overall system efficiency is enhanced by the chilled air by-product of the turbo expander which is used to generate more electrical power from an associated fuel-driven generator set, and/or by the waste heat from the compressor and from the generator set exhaust which is used in a Combined Heat and Power system (CHP) to power either a steam-driven generator set or an absorption chiller.

20 Claims, 14 Drawing Sheets

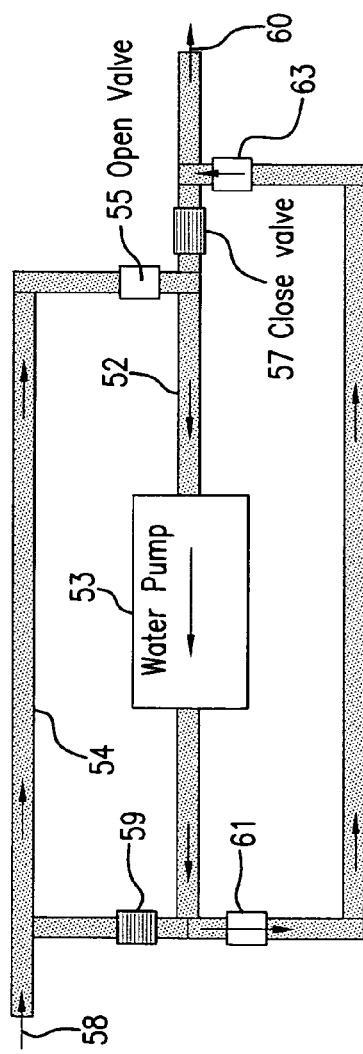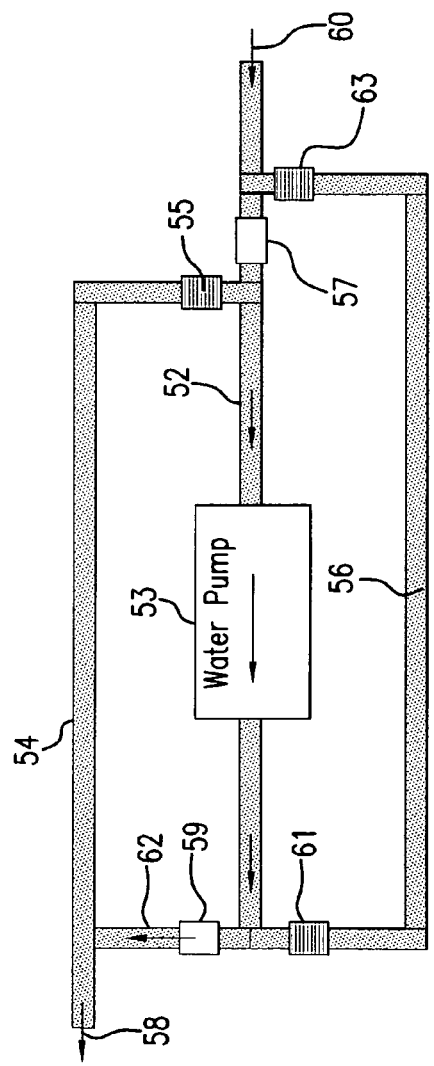
FIG. 2A

1. Morning (First 7 Days, All Day)

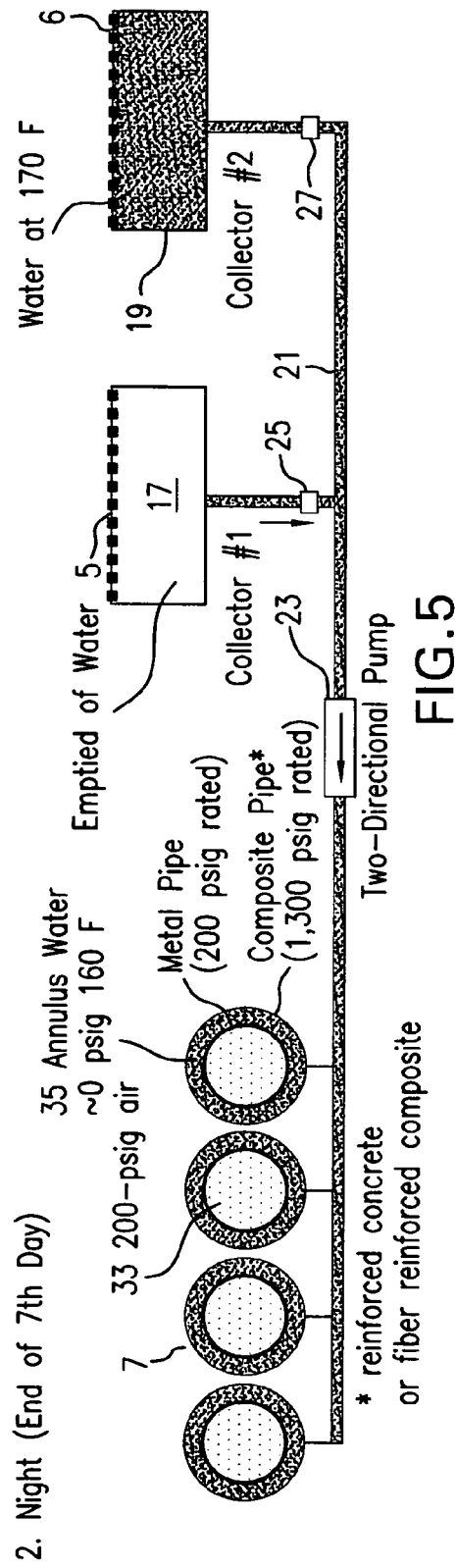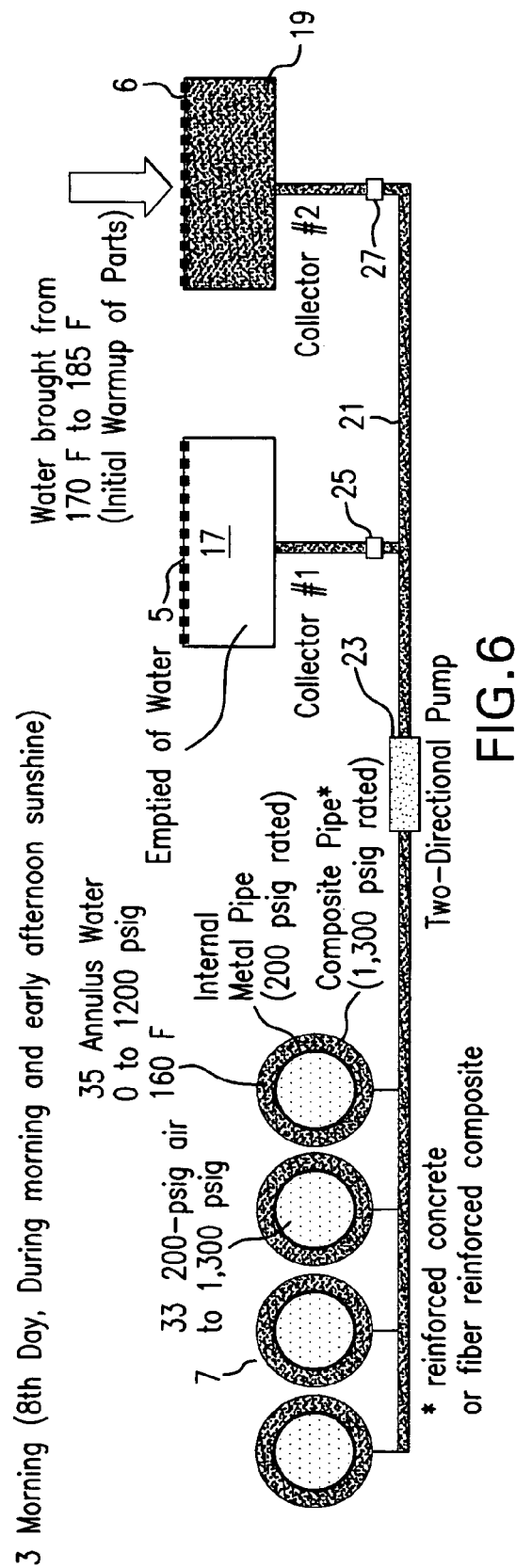

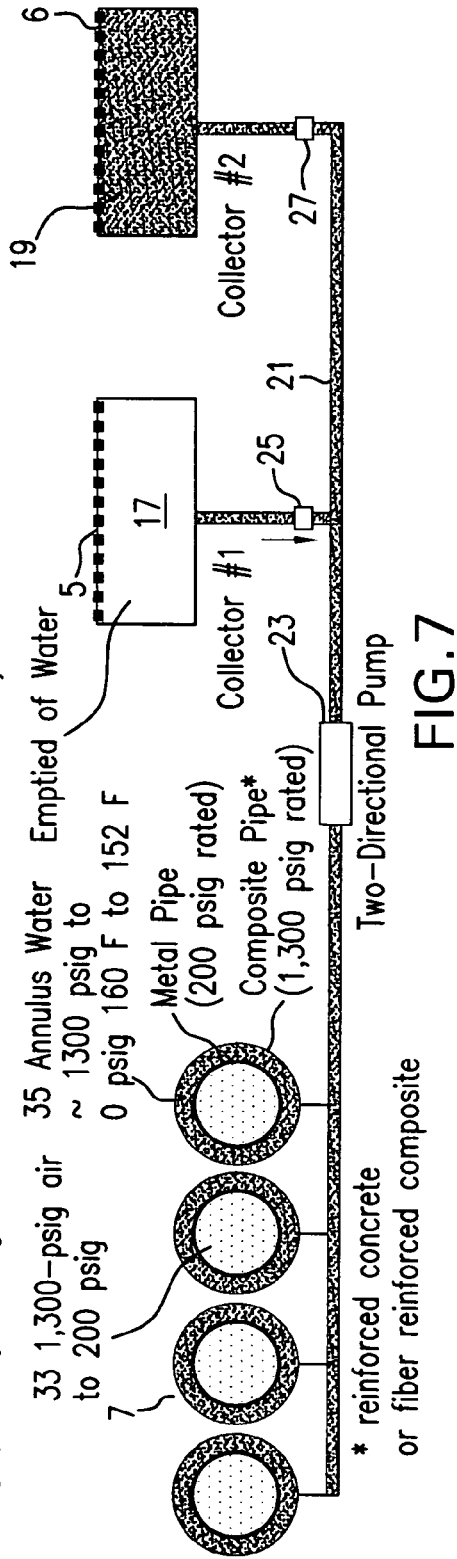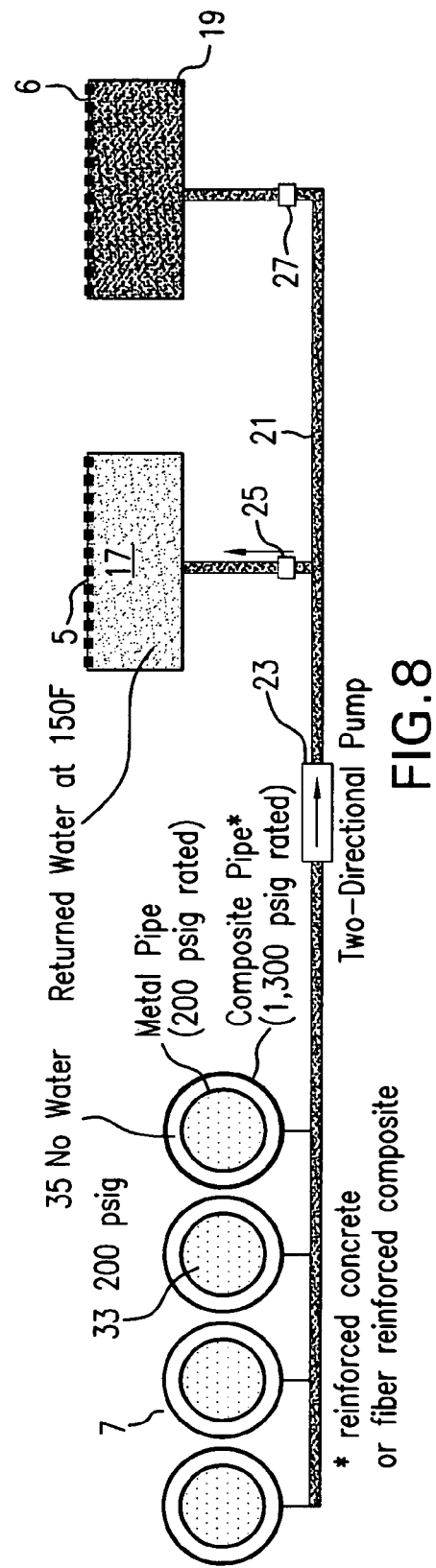

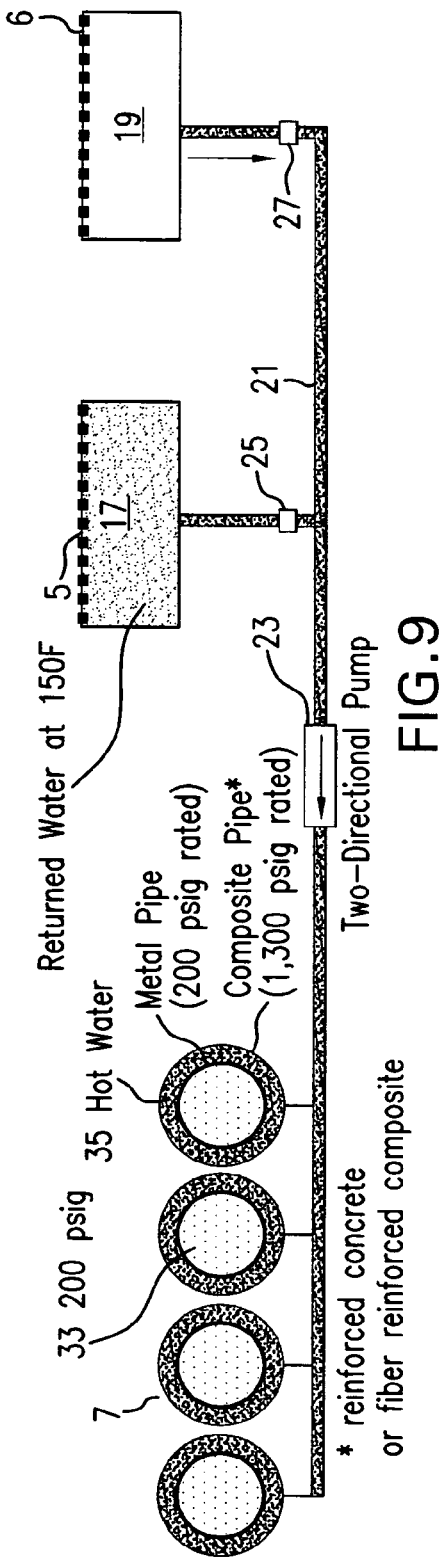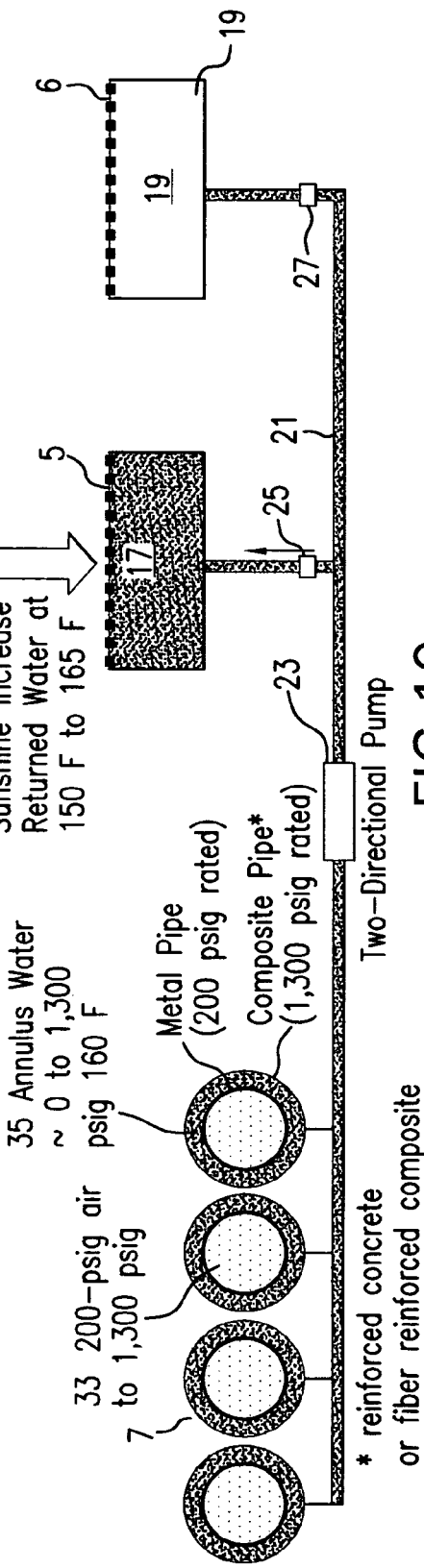

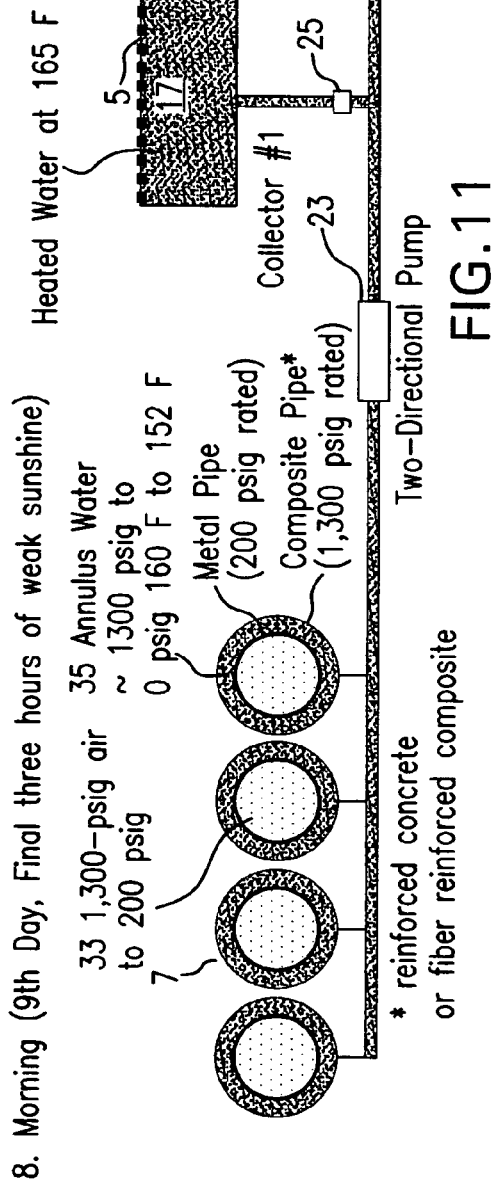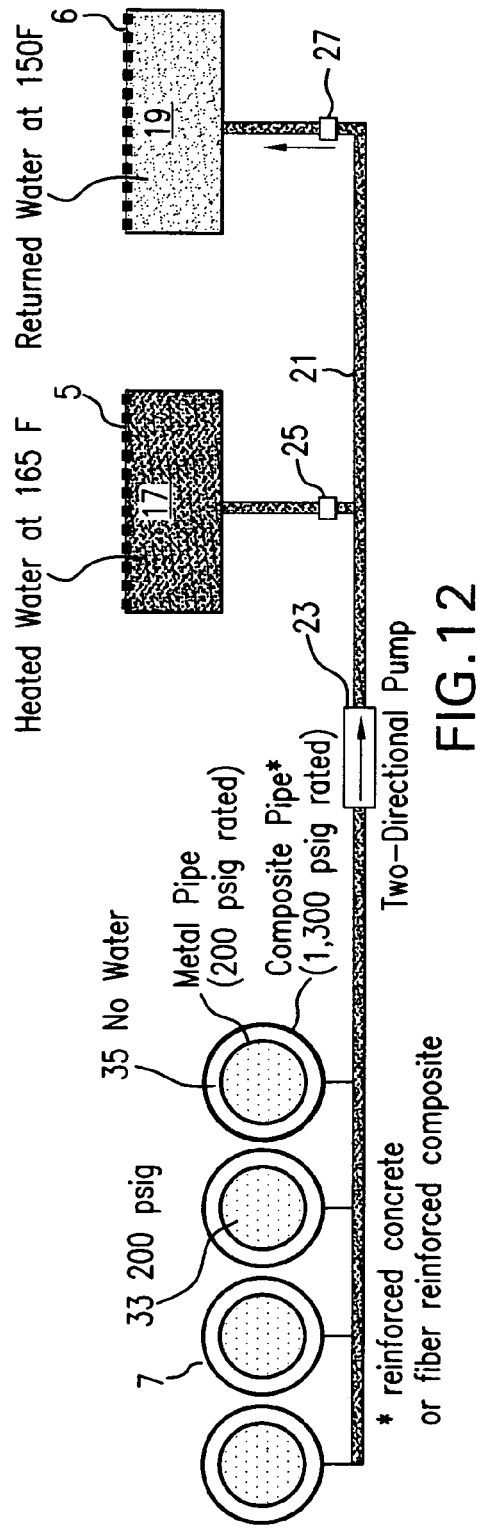

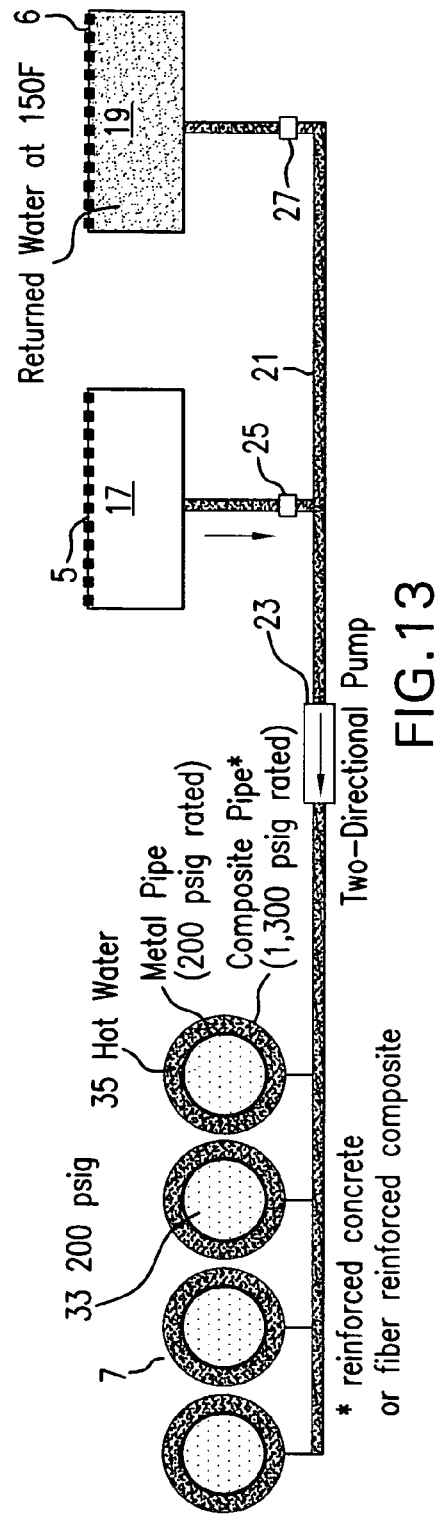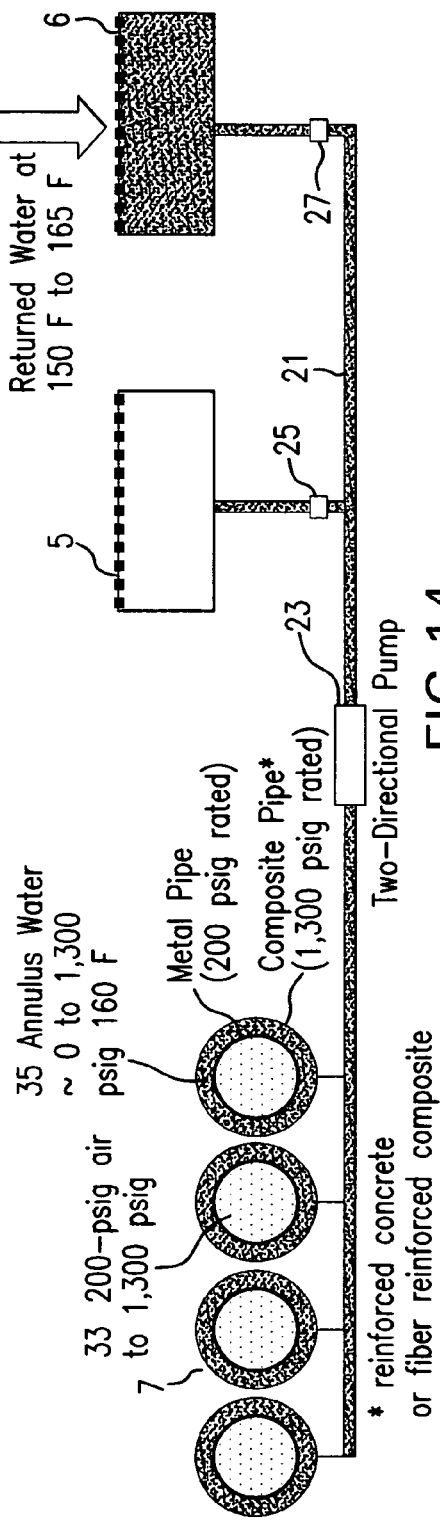

FIGURE 15

| WATER COOLED STAGE | WATER COOLED STAGE | WATER COOLED STAGE | WATER COOLED STAGE | NON-WATER COOLED STAGE |
|---|---|---|---|---|
| Stage 1 | Stage 2 | Stage 3 | Stage 4 | Stage 5 |
| 14.7 psia | 40.5 psia | 112 psia | 276.4 psia | 600 psia |
| 70 F | 70 F | 70 F | 70 F | 70 F |
| 40.6 psia | 112.1 psia | 276.5 psia | 600 psia | 1200 psia |
| 324.5 F | 324.5 F | 309.67 F | 309.67 F | 260.96 F |
| 16,251 #/hr | 16,251 #/hr | 16,251 #/hr | 16,251 #/hr | 16,251 #/hr |
| 9,479.75 SCFM | 9,479.75 SCFM | 9,479.75 SCFM | 9,479.75 SCFM | 9,479.75 SCFM |
| 1,037.4 HP | 1,037.4 HP | 976.2 HP | 976.2 HP | 791.4 HP |
| 9.14 SCFM/hp | 9.14 SCFM/hp | 9.71 SCFM/hp | 9.71 SCFM/hp | 11.98 SCFM/hp |
| 75% efficiency | 75% efficiency | 70% efficiency | 60% efficiency | 60% efficiency |
| 9.14 SCFM/hp | 4.57 SCFM/hp | 3.11 SCFM/hp | 2.35 SCFM/hp | 1.97 SCFM/hp |

FIGURE 16

|  | RATED (HP) | EFFICIENCY (%) | HEATED WATER (%) | HEATED WATER (BTU/MIN) | OUTPUT AIR TEMPERATURE (F) | OUTPUT AIR (#/MIN) |
|---|---|---|---|---|---|---|
| STAGE 1 | 1,037.4 | 75 | 13 | 5,719 |  |  |
| STAGE 2 | 1,037.4 | 75 | 13 | 5,719 |  |  |
| STAGE 3 | 976.2 | 70 | 15 | 6,210 |  |  |
| STAGE 4 | 976.2 | 60 | 20 | 8,280 |  |  |
| STAGE 5 | 791.4 | 60 |  |  | 260.96 | 270.85 |
| TOTAL | 4,818.6 |  |  | 25,928 |  |  |

TOTAL   3,595   KW

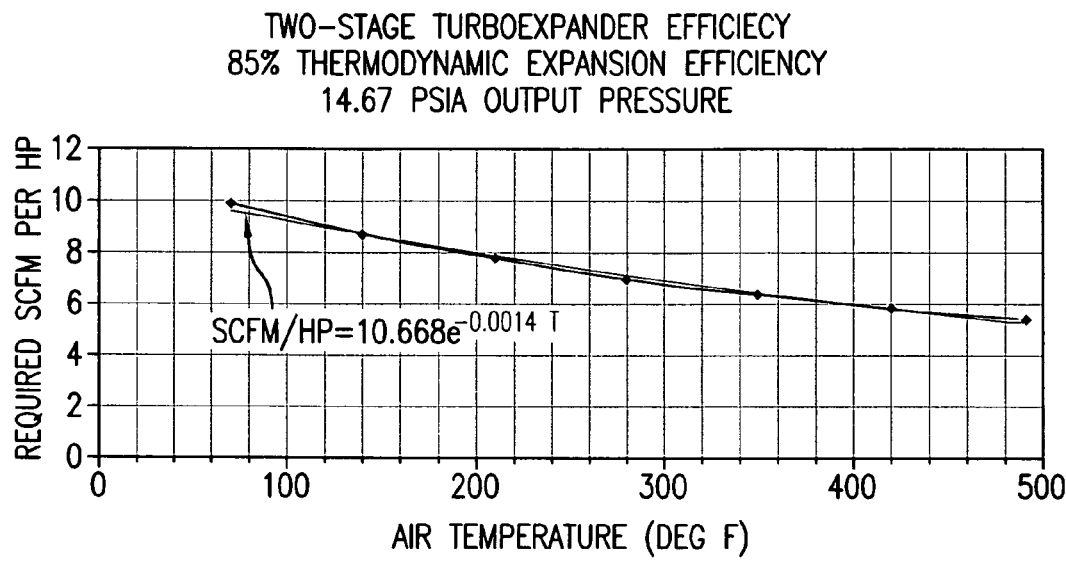

TWO-STAGE TURBOEXPANDER EFFICIECY
85% THERMODYNAMIC EXPANSION EFFICIENCY
14.67 PSIA OUTPUT PRESSURE $SCFM/HP = 10.668 e^{-0.0014\,T}$

FIG. 17

|  | STAGE 1 INPUT PRESSURE | STAGE 1 INPUT TEMPERATURE | STAGE 1 OUTPUT PRESSURE | STAGE 1 OUTPUT TEMPERATURE |
|---|---|---|---|---|
|  | (PSIA) | (DEG F) | (PSIA) | (DEG F) |
| SCENARIO 1 | 200 | 70 | 90 | *-23.2 |
| SCENARIO 2 | 200 | 140 | 90 | 35.0 |
| SCENARIO 3 | 250 | 300 | 50 | 61.6 |
| SCENARIO 4 | 250 | 400 | 50 | 131.7 |

* OUTPUT AND INPUT AIR MUST BE DRY

|  | STAGE 2 INPUT PRESSURE | STAGE 2 INPUT TEMPERATURE | STAGE 2 OUTPUT PRESSURE | STAGE 2 OUTPUT TEMPERATURE |
|---|---|---|---|---|
|  | (PSIA) | (DEG F) | (PSIA) | (DEG F) |
| SCENARIO 1 | 90 | *-23.2 | 14.67 | -175 |
| SCENARIO 2 | 90 | 35.0 | 14.67 | -136.3 |
| SCENARIO 3 | 50 | 61.6 | 14.67 | -70 |
| SCENARIO 4 | 50 | 131.7 | 14.67 | -43.4 |

|  | ELECTRICAL** | THERMAL | COMPRESSOR EFFICIENCY 200 TO 1200 PSIG | SYSTEM EFFICIENCY (WITHOUT HVAC) | SYSTEM EFFICIENCY (WITH HVAC) |
|---|---|---|---|---|---|
|  | (SCFM/HP) | (SCFM/HP) | (SCFM/HP) |  |  |
| SCENARIO 1 | 9.70 | 9.71 | 3.3 | 34.04% | 68.02% |
| SCENARIO 2 | 8.53 | 11.28 | 3.3 | 38.70% | 67.95% |
| SCENARIO 3 | 6.31 | 17.09 | 3.3 | 52.32% | 71.63% |
| SCENARIO 4 | 5.55 | 27.66 | 3.3 | 59.46% | 71.39% |

FIGURE 18

3.60 MW (electrical)
3.00 MW (thermal)
6.60 MW (total)
3 Hrs 3,600 kW
4,826 hp
9.1 scfm/hp
43,914 scfm
180 minutes
7,904,558 scf required 4 ft diameter
9,250 ft length
116,239 cu ft (actual)
9,624,536 scf at 1,214.67 psia
1,700,955 scf at 214.67 psia
7,923,581 scf available

FIGURE 19

5 kW-Hrs/Sq M/day
2,313 ft long trench
4 ft wide trench
9,250 sq ft (footprint of pipe)
859 sq M
4,297 kW-Hrs/day
15,468,356 kW-sec/day
0.948 (BTU/sec)/kW
14,664,002 BTU available/day

FIGURE 20A

External Receiver
4 ft wide trench
1.7 ft deep trench
2,313 ft long
981,240 # water
117,655 gallons water
654 gpm water 3 hours

External Receiver Water Temperature Increase
1 BTU/(# F) water
981,240 # water
981,240 BTU/F water
15 F temperature change
14,718,600 BTU required per day (no losses)

FIGURE 20B

FIGURE 21
Jacket Size
4 ft inside diameter
4.068 ft outside diameter
9,250.0 ft length
15,942.9 cu ft
62.4 #/cu ft
994,835 #
1 BTU/(# F)
994,835 BTU/F
116,239 sq ft area
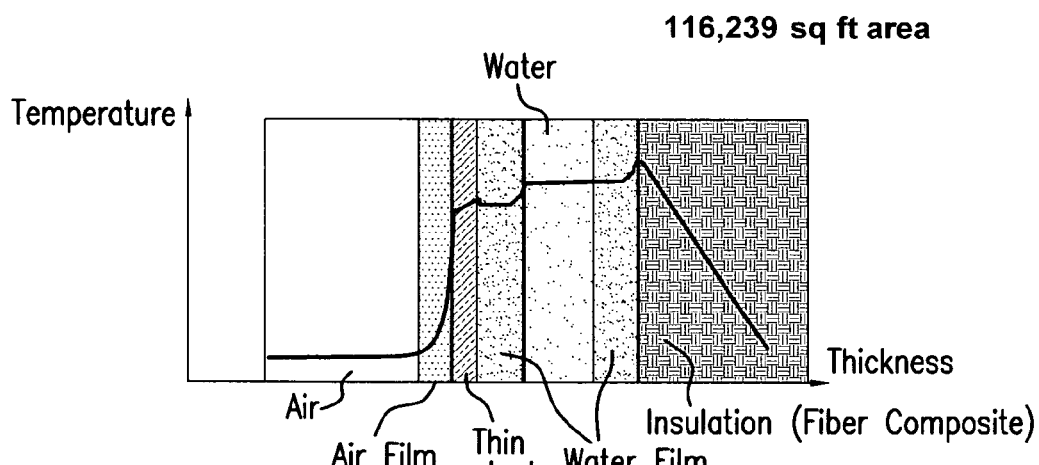
FIG.22
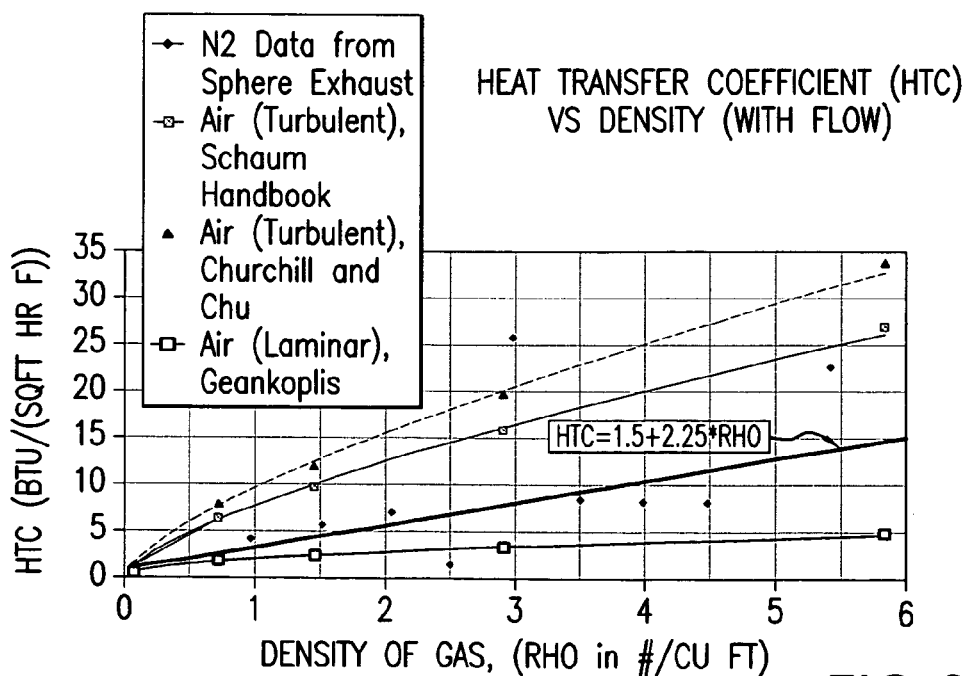
FIG.23

METHOD AND APPARATUS FOR USING SOLAR ENERGY TO ENHANCE THE OPERATION OF A COMPRESSED AIR ENERGY STORAGE SYSTEM

RELATED APPLICATIONS

This application claims priority from U.S. Provisional Application Ser. Nos. 61/062,149, filed on Jan. 24, 2008, 61/068,170, filed on Mar. 5, 2008, and 61/195,418, filed on Oct. 7, 2008, all of which are incorporated herein by reference in their entirety.

BACKGROUND OF THE INVENTION

Due to the growing demand for energy throughout the world, concerns have grown about the future of the world's energy supplies. Not only are there limited supplies of oil and coal reserves available within the earth's crust, but due to the ongoing security problems and concerns that now exist throughout the world today, there has been a growing desire to reduce our nation's reliance on foreign oil.

Indeed, many energy experts believe that a successful energy solution must include the ability to harness energy from what are often called natural renewable resources, such as the sun and wind. The renewability and abundant availability of these resources make them well suited to the development of potentially viable long term solutions, and many believe that whatever efforts that are currently being made to use these resources must significantly be expanded before the world's oil and coal reserves eventually run out.

One problem associated with the use of renewable energy such as the sun and wind is that the energy is not always available when the energy is needed. Solar power, for example, is only available during the day, and is most effective when the sun is shining brightly, and therefore, the extent to which energy can be provided by the sun is not always predictable. Wind energy is also only available when the wind is blowing, and therefore, it is not a highly reliable source of energy. Another drawback to these resources is that even when energy is available, the amount of energy that they generate is not always consistent. For example, even when the wind blows, it does not always blow at the same speed, or at regular intervals, and therefore, the amount of energy that can be generated is not always consistent. The same is true of solar energy, i.e., the degree to which the sun is shining and available can be sporadic; it often depends on the weather, and therefore, it is never certain how much energy can be generated at any given moment in time.

One potential solution to these problems is to store the energy during times when the energy is available, and using the energy when it is needed most. This is often referred to as time-shifting. Nevertheless, one problem associated with time-shifting relates to the inherent inefficiencies that can result from having to store energy in one form, and then converting the energy into another form before it can be used. This is especially true of compressed air energy storage systems that store compressed air in high pressure storage tanks, wherein the energy must be converted by a generator to produce usable electricity. In such case, the energy used from storage can often end up costing more than the energy that was stored. These inefficiencies can significantly reduce the economic incentives that are needed to promote the installation of these potentially viable systems.

Notwithstanding these problems, because the sun represents a significant natural resource that will never run out, there is a strong desire to develop a system that can not only harness the sun's energy, i.e., to produce electricity, but to store the energy, and do so in a manner that is efficient and cost-effective, wherein the energy that is generated can then be made available on a continuous and uninterrupted basis, so that it can be used during peak demand periods, as well as when little or no sun is available. Moreover, while there has been a steady increase in the number of photovoltaic (PV) cell projects that have been initiated and developed in recent years, each of these projects has had a serious shortfall in electric power production particularly in the late afternoon and early evening when the power demand is high. Thus there is a need to install a PV panel system wherein the excess energy can be collected and stored during the high solar irradiation period and then used during the weaker solar irradiation period.

SUMMARY OF THE INVENTION

The present invention represents an improvement over past attempts to harness energy from renewable resources such as the sun and wind insofar as the present system preferably incorporates not only the advantages of using solar energy, but the advantages of using compressed air energy storage systems, wherein some of the previous inefficiencies of using compressed air are overcome by the heat generated by the sun, wherein the present system helps to reduce the inefficiencies and inconsistencies that have existed in past systems. Generally speaking, the invention relates to a method and apparatus that uses solar energy to enhance the efficiency of a compressed air energy storage system, and that can also use the compressed air energy storage system to enhance the efficiency of the solar energy generated thereby.

Preferably, the present invention comprises a photovoltaic cell panel that can collect solar energy and convert it into electrical energy, wherein at least a portion of the energy can be used to drive a compressor to produce compressed air energy, which in turn, can be stored in a high pressure storage tank. Two solar receiving panels are also preferably used to collect the sun's energy and use it to produce heated water which can, then be circulated and stored within an annulus surrounding the storage tank, wherein the heated water can then help to regulate the temperature of the compressed air within the tank, particularly when the compressed air is being released by a turbo expander, wherein not only is electricity generated, but chilled air is also produced as a by-product.

This way, when compressed air is released using the turbo expander, excessive temperature drops within the tank and compressed air can be avoided. And by maintaining and even increasing the temperature of the compressed air, the air pressure within the tank can also be maintained, which enhances the efficiency of the overall system. System efficiency can also be enhanced by making use of the chilled air by-product exhausted from the turbo expander to generate more electrical power from an associated fuel-driven generator set, and/or by using the waste heat from the compressor (and/or from the generator set exhaust) in a combined heat and power system (CHP) to power either a steam-driven generator set or an absorption chiller.

The various components of the system will now briefly be described.

The present invention preferably comprises at least two types of solar energy collecting means. First, a photovoltaic cell panel is preferably used to collect solar energy and generate electricity when the sun is shining. In one embodiment, a large photovoltaic panel can be used to generate electricity that can be used to provide energy directly for an associated facility or small community, etc. But because the sun does not always shine in sufficient amounts to generate a consistent uninterrupted supply of energy, the present invention preferably comprises a means for storing the energy, such that it can be used later when the demand is high, and/or to reduce peak demand power spikes and surges, etc.

Accordingly, at least a portion of the electricity generated by the photovoltaic panel can be used to drive a compressor which in turn compresses air into a high pressure storage tank. This way, when the sun is shining, the system can be used to generate compressed air energy which can be used later. When the sun is not shining, the present system preferably enables the compressor to be operated using a conventional source, such as power from the grid, a utility plant, a wind farm or a wind turbine. In either case, the energy is preferably collected when the energy is most available and costs are relatively low, which, in the case of power grids and utility plants would be during the nighttime, and in the case of wind farms and wind turbines would be when the wind naturally blows.

Second, in addition to using a photovoltaic cell to generate energy, the present invention preferably uses at least one solar receiving panel connected to a container of water that can be used to heat the water contained therein. For purposes of this discussion, the term water shall include any water-like fluid or liquid that can be used as the conductor. Once the water is heated, it can then be transferred, stored and used to maintain the temperature of the compressed air within the tank. This is done by storing the heated water in an annulus surrounding the compressed air storage tank to maintain the temperature of the compressed air therein.

The receiving panel is preferably provided with an appropriate surface geometry to collect solar energy, wherein that energy can be used to heat the water contained within the container, such as up to 165 degrees F. or more. The solar receiving panels preferably comprise a wedge-shaped dimpled (egg-carton) surface covered with a black coating that essentially floats on top of the water contained within the containers, which helps to ensure that there is sufficient contact between the surface and the water stored therein to enable proper heat transfer to occur. This also helps to avoid the water from escaping from the container as a liquid or vapor. The wedge shaped surface also helps to ensure that a proper amount of solar irradiation is absorbed by the panels to generate heat regardless of the angle at which the sun's rays hit the surface. The sun's rays are preferably allowed to enter into the wedge shaped sections and because of the gaps or notches therein, the sun light can be reflected internally, thereby helping to make efficient use of the radiated energy from the sun. In addition to the geometry of the surface, the black coloring also helps to ensure that the sun's heat is absorbed properly by the panels. By using the heated water to maintain the temperature of the compressed air within the tank, not only can the air pressure be better maintained, but greater system efficiencies can also be achieved.

The design of the high pressure storage tank also plays a role in being able to improve the efficiencies of the system. The tank, in such case, is preferably designed with an inner pressure vessel and an outer wall that are concentrically oriented. This way, the compressed air can be stored within the inner pressure vessel, and the heated water can be stored within an annulus that surrounds the inner vessel, wherein the heated water that surrounds the inner wall can help maintain the temperature of the compressed air in the tank.

It should be noted here that the materials and properties used to make the inner and outer walls of the storage tank are preferably different. For example, the inner wall is preferably made thin with a relatively strong elastic material such as steel that enables a sufficient amount of heat transfer to occur between the heated water and compressed air, whereas, the outer wall is preferably made thick and relatively strong with sufficient insulating properties to hold the heat in, such as reinforced concrete or fiber reinforced composite materials. This way, the conductivity of the inner wall can be used to help promote heat transfer between the heated water and compressed air, whereas, the outer wall can be strong and thick enough to withstand the pressures that are exerted against the tank, as will be discussed, as well as preserve the temperature of the air and water contained therein.

One problem overcome by the present system is achieving a happy medium between making the inner wall thin enough to provide sufficient heat transfer characteristics, while at the same time, making the tank strong enough to withstand the significant pressures that can exist within the vessel, such as up to 1,300 psia. This problem is complicated by the fact that under normal circumstances one way to improve conductivity is to make the inner wall that separates the two substances thinner, whereas, one way to increase the strength of the inner wall is to make it thicker. In the average case, for example, a compressed air energy storage tank may require pressures as high as 1,300 psia to produce an adequate supply of compressed air, but the question is whether the inner vessel in the present case with its conducting properties can be designed to maintain that kind of pressure on its own.

The present invention preferably solves this problem by making the inner wall elastic and relatively thin, and the outer wall relatively strong and thick, but also by introducing the heated water into an annulus that exists between the inner and outer walls, and then closing the annulus, thus allowing water pressure within the annulus to build up, such that, when the pressure within the inner wall is increased, water within the annulus (and the outer wall that holds it) serve to prevent the inner wall from bursting. That is, when the air pressure within the inner pressure vessel is increased beyond the capacity of the inner wall, the inner wall will expand and stretch, and therefore, the water pressure within the annulus will also increase, but because water is incompressible, and the outer wall is stronger, any pressure exerted against the inner wall will be maintained by the water in the annulus which exerts pressure against the outer wall. Therefore, it is the strength of the outer wall that will help dictate the maximum pressure amounts that can be maintained within the tank. Accordingly, even if the inner wall is designed to withstand only a nominal amount of air pressure, i.e., such as 200 psia in the preferred embodiment, the outer wall is preferably designed to withstand over 1,300 psia, and therefore, the system is preferably able to withstand overall internal air pressures of 1,300 psia or more.

Stated differently, when there is no water in the annulus there is no pressure, and therefore, when there is 200 psig in the pressure vessel, there is a 200-psig pressure differential across the inner wall. When the water is first sent to the annulus, the inner wall sustains the internal pressure so that the water can be transferred to the annulus with little or no backpressure. But when the water fills the annulus, and the valve is closed, air within the pressure vessel can then be compressed above 200 psig, such as up to 1,300 psig, wherein the inner wall stretches, and because the water in the annulus is sealed by the valve, and is incompressible, and the outer wall is thicker and stronger than the inner wall, and able to withstand up to 1,300 psig, the internal pressure of 1,300 psig within the inner pressure vessel can be maintained. In such case, the expansion of the inner wall is limited because the water in the annulus is pressurized by the expanding inner wall, which acts like a balloon that is supported by the "incompressible" water that transmits its hydrostatic pressure to the outer wall.

The inner wall is preferably made of steel, or other metal, such as aluminum or copper, which can be made relatively thin in order for proper heat transfer to occur. Steel is also elastic and therefore allows the inner wall to expand and stretch as the pressure within is increased. Ideally, the inner wall is designed to stretch to within 10% of its elastic limit. On the other hand, the outer wall is preferably made of a thick fiber reinforced composite material or pre-stressed concrete or other strong material that can withstand the pressures that are exerted against it.

Based on the above, when the air pressure within the inner wall is increased to above its capacity, i.e., above 200 psia in the preferred embodiment, as long as the annulus between the inner and outer walls is filled with water, and sealed, and the water pressure in the annulus is increased, the inner wall will be able to withstand the higher air pressures amount, i.e., as high as 1,300 psia, or whatever the maximum capacity of the outer wall is. This would not be the case if no water was in the annulus, or the valve was open, or if the outer wall was not designed to withstand the greater pressure amounts. Since the elastic limit of the inner wall is much lower than the limit of the outer wall, it would not be able to withstand the added pressure on its own.

The present system also preferably incorporates a multi stage turbo expander that is associated with an electrical generator and power conditioner, wherein the compressed air can be released and expanded to produce electricity. Expanding the compressed air also creates chilled air as a by-product, and therefore, the present system preferably incorporates a means of using the chilled air to provide cooling for an ancillary device, such as HVAC, refrigeration, or desalination device. The cool air can also be used as the inlet into an associated fuel driven turbine generator set (GenSet). Heat derived from the compressor can also be used in ancillary systems, such as for showers, laundries, baths, steam-driven (GenSet), absorption chiller, etc., as well as to provide heat for the heated water in the annulus.

By being able to store the compressed air within the inner pressure vessel, and the heated water within the annulus that surrounds the inner wall, the temperature of the compressed air can be maintained when the turbo expander is operated to release the compressed air, which would otherwise cause the air to become significantly chilled. Accordingly, the present system helps to maintain the temperature and pressure of the compressed air within the storage tank, and therefore, improve the overall efficiency of the compressed air energy storage system.

Based on the above features and components, the present method preferably operates in the following manner:

Preferably, two solar receiving panels are initially exposed to the sun's rays during the daytime hours wherein the water contained in the associated containers begins to heat up. This can, for example, go on for several days, or up to a week or more, to ensure that enough sunshine is available and provided to increase the temperature of the water in the containers, i.e., which in the preferred embodiment is about 165 degrees F. Preferably, the system is able to collect solar energy for at least eight hours each day, such as during the morning, noon and early afternoon.

When the sun is not available to drive the photovoltaic panel, the present method preferably contemplates being able to use an auxiliary source of energy, such as the power grid, or nearby utility plant, or a wind farm, or wind turbine, to produce compressed air energy that could be transferred into the pressure vessel in the tank. And preferably, to reduce the cost of using this energy, this is preferably done when energy demands and costs are relatively low, such as during the nighttime hours, or when the sun shines or the wind naturally blows.

At the same time, or otherwise when the sun is shining, such as during the morning, noon and afternoon hours, the photovoltaic panel is preferably used to produce electricity, which in turn, can be used to drive the compressor to produce compressed air energy, which can then be transferred to the pressure vessel of the tank and stored. Initially, the compressor should only be activated to increase the pressure within the vessel to the low pressure amount, which, in the preferred embodiment is 200 psia. This is based on the capacity of the inner wall, since at this point there is no water or pressure within the annulus to support more pressure in the vessel.

Once the water in one of the containers has reached the predetermined temperature, such as 165 degrees F., the heated water can be transferred into the annulus of the storage tank. This can be done by shutting the valve to one of the containers and opening the valve to the other container, and operating the pump to begin pumping the water into the tank. Preferably, the annulus has no air pressure and is vented so that as the water fills the annulus, there is no back pressure exerted on the pump. And preferably, this is done at night before the morning sun begins to shine so that the valves can be shut before the compressor begins to increase the pressure of the compressed air in the tank. Note that there can be more than one storage tank, in which case, the heated water can be distributed into the annuluses of all the tanks, but for convenience, this summary will mention only a single tank.

Then, once the annulus is completely filled with heated water, and the valve is closed, such as during the next morning when the sun is shining, the photovoltaic panel is preferably used to increase the pressure of the compressed air to its maximum pressure. The pressure is preferably increased until the maximum pressure reached is about 1,300 psia.

As discussed above, even though the inner wall does not have the capacity to withstand that kind of pressure on its own, the total pressure rating of the tank can be determined by the strength of the outer wall. That is, as the pressure within the inner vessel is increased, the inner wall will begin to expand, but because the annulus is completely filled with water, and water is incompressible, pressure within the annulus will help to maintain the air pressure within the inner wall. Moreover, when the internal air pressure is 1,300 psia, the tensile resistance in the stretched cylindrical inner wall is preferably able to impose a 200 psid (psi "difference"). Thus the outermost wall needs to only withstand an equivalent 1,100 psia air pressure, which is a built in safety feature.

Once the tank is filled with air pressure, such as to the maximum degree possible, the compressed air is ready to be released, which can occur during the late afternoon. This allows the system to provide backup energy during the peak daytime hours. At this point, the compressed air is preferably at about room temperature, although not necessarily so, and, the compressed air is preferably released by a turbo expander, which is combined with a generator and power conditioner to produce electricity. At the same time, the heated water in the annulus transfers its heat to the air in the vessel so that excessive temperature drops can be avoided.

And, as the compressed air is released via the turbo expander impeller, the chilled air by-product exhausted from the turbo expander can be used to drive an associated cooling device, such as an HVAC, refrigerator, or desalination device, or a related fuel driven generator set. The temperature of the heated water within the annulus is also reduced as the compressed air in the pressure vessel is decompressed and tends to drop in temperature as it drop in pressure.

Once the air pressure within the inner wall is reduced to below its capacity, i.e., to below 200 psia in the preferred embodiment, the valve can be opened and the water within the annulus can be transferred back to the first container, which preferably occurs before the sun comes up, such that the sun can begin to heat the water in the container again after the water is fully transferred. The temperature of the water at this point can be lower than it was before, although not substantially lower, i.e., the temperature could drop from 165 degrees F. down to 152 degrees F., for example, as the compressed air is released. This leaves the annulus empty of water, i.e., at zero psig (or 14.67 psia), whereas, the pressure vessel may still have an internal pressure of 200 psia (or 186.3 psig), wherein the inner wall preferably stretches elastically to contain the pressure difference.

Next, such as later that same night, the heated water in the second container is preferably transferred into the annulus of the tank. This can be done by shutting the valve to the first container and opening the valve to the second container, and operating the pump to begin pumping the water toward the tank.

Once the annulus of the tank is completely filled again, and the tank valve is closed again, which can be done by the next morning, the photovoltaic panel can begin operating again to supply energy to the compressor to increase the pressure of the air within the pressure vessel again. This is preferably done until the maximum air pressure of 1,300 psia is reached within the inner wall. At the same time, such as during the day, the water in the first container is heated again.

Once the air pressure in the pressure vessel is increased to a specified maximum, the compressed air is ready to be released by the turbo expander to produce electricity. Chilled air can also be produced as a by-product which can be used to drive an associated cooling device, such as an HVAC, refrigerator, or desalination device, or a related fuel driven generator set. Next, as the air pressure within the inner pressure vessel is reduced to below its capacity, i.e., 200 psia, the valve can be opened again and the heated water can be transferred back to the second container. This preferably occurs before the morning, so that the sun can begin to heat the water again.

The next day, when the water in the first container is heated again, the cycle can repeat, i.e., the heated water in the first container can be transferred back to the annulus of the tank, and the compressor can be operated again to begin filling the pressure vessel with more pressure.

At any given time, when the sun is not available to drive the photovoltaic panel to compress the air, the present method preferably contemplates being able to use an auxiliary source of energy, such as the power grid, or nearby utility plant, or wind farm, or wind turbine, to produce compressed air energy that could be transferred into the pressure vessel of the tank. And preferably, to reduce the cost of using this energy, this is preferably done when energy demands and costs are relatively low, such as during the nighttime hours, or when the sun shines or the wind naturally blows.

Again, the main advantages of the present system is that the energy derived from the sun (and/or wind) can be used and stored so that the energy can be used when it is most needed, which may or may not coincide with when the energy is available. And, in doing so, the present system makes efficient use of not only the electricity produced from the use of solar photovoltaic and thermal energies, but the energy storage capacity of a compressed air energy storage system, including the heat input from the sun which enhances the energy provided by the system, as well as the chilled air thermal output which can be used to provide cooling for associated devices.

BRIEF DESCRIPTION OF THE DRAWINGS

FIG. 2A is a schematic drawing showing the various components of an alternate pump with one direction-two way layout;

FIG. 5 shows the second phase during which the heated water from the first container fills the tanks, and in particular, the annulus between the inner and outer walls, wherein the valve is closed;

FIG. 6 shows the third phase during which the air pressure within the tanks and in particular the inner pressure vessel can be increased to the high pressure amount, wherein the water pressure in the annulus can also be increased;

FIG. 7 shows the fourth phase during which the air pressure within the pressure vessel can be released by the turbo expander, from the high pressure amount to the low pressure amount, which in turn causes the water pressure in the annulus to be decreased to zero (gage pressure);

FIG. 8 shows the fifth phase during which the water within the tanks is transferred back to the first solar receiving container;

FIG. 9 shows the sixth phase during which the heated water from the second container is pumped to fill the annulus, wherein the valve is closed;

FIG. 10 shows the seventh phase during which the air pressure within the inner pressure vessel is increased up to the high pressure amount, wherein the water pressure within the annulus can be increased;

FIG. 11 shows the eighth phase during which the air pressure within the vessel can be released by the turbo expander, which in turn causes the water pressure to be decreased to zero (gage pressure);

FIG. 12 shows the ninth phase during which the water within the annulus is transferred back to the second container;

FIG. 13 shows the tenth phase during which the heated water from the first container is pumped to fill the annulus again, wherein the valve is closed again;

FIG. 14 shows the eleventh phase during which the air pressure within the vessel can be increased to the high pressure amount, and the water pressure within the annulus can be increased to the high pressure amount, wherein the cycle is repeated again;

FIG. 15 is a chart showing the properties of a water-cooled five stage air compressor;

FIG. 16 is a chart showing a summary of the compressor outputs for heating water as well as the air in the pressure vessel;

FIG. 17 is a chart showing the required air flow from the pressure vessel to produce a unit of power (HP) as a function of air temperature at 200 psia;

FIG. 18 is a chart showing four scenarios of input pressure and input temperature for a two stage turbo expander;

FIG. 19 is a chart showing the requirements for producing power using a turbo expander;

FIG. 20A is a chart showing how much power is provided by the solar panel;

FIG. 20B is a chart showing how much the water temperature increases (15° F.) as a result of the energy provided by the solar panel;

FIG. 21 is a chart showing the annular radial gap (4.068 ft-4.000 ft) for water in the pressure vessel;

FIG. 22 is a chart showing the temperature profile between compressed air and outer insulator cylinder (Note that the insulation can be fiber composite as indicated or reinforced concrete);

FIG. 23 is a chart showing the total heat transfer coefficient between the air and inner wall;

DETAILED DESCRIPTION OF THE INVENTION

Figure 1:
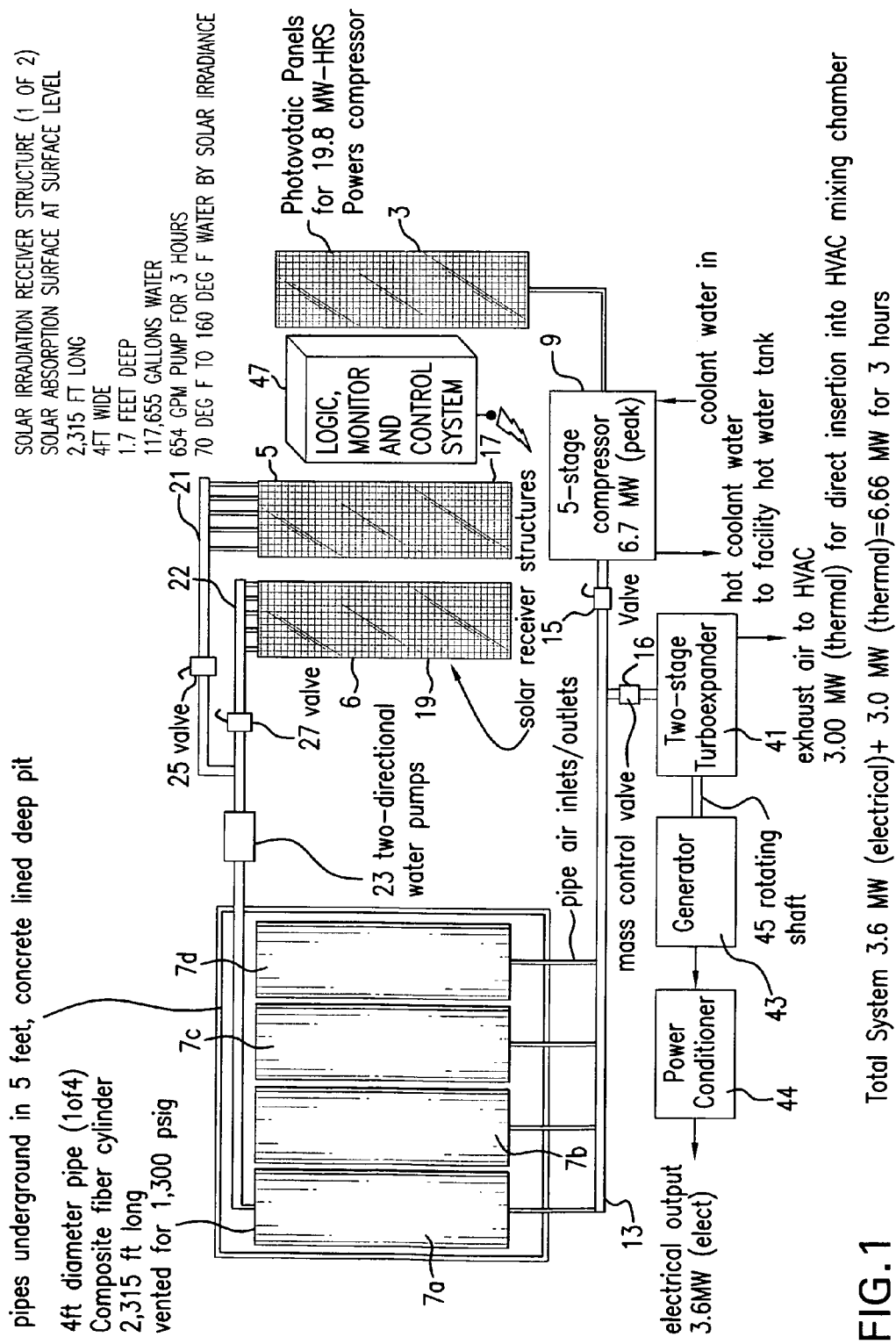
FIG. 1 is a schematic drawing showing the various components of the solar enhancement system of the present invention, including the photovoltaic panel, the two solar receiving panels, the storage tanks, and the turbo expander set with generator.

FIG. 1 shows the main components of the present system 1, including a photovoltaic cell panel 3, two solar receiving panels 5, 6, and several high pressure storage tanks 7a, 7b, 7c, and 7d, among other components.

Photovoltaic panel 3 is preferably capable of collecting solar photovoltaic energy from the sun's rays and converting it into electricity. Preferably, there are two different configurations that can be used in connection with the present system, including 1) highly transmissive photovoltaic solar cells, and 2) highly reflective photovoltaic solar cells. In either case, the solar cell will use a portion of the irradiated solar energy received by the panel for conversion to electricity, wherein the remainder is preferably either transmitted to a back-plate that conducts the energy away or reflected from the front surface to avoid overheating. The electricity produced by panel 3 can be used directly, such as when a large panel that can supply energy for immediate use to a facility or small community is provided.

Panel 3 is preferably connected to a compressor 9 so that the solar energy generated by panel 3 can be used to drive compressor 9. Compressor 9 is preferably a multi-stage compressor that can be used to compress air into tanks 7a, 7b, 7c and 7d, via pipe 13. Compressor 9, for example, can be a five stage compressor with water cooling steps between each stage, wherein the fifth stage can produce compressed air that is relatively hot, as shown in FIG. 15. The discharge of compressed air from compressor 9 preferably produces air at a relatively high temperature, which can be helpful in being able to recover the overall efficiencies of the system. Heat exchangers can, nevertheless, be used to recover heat generated by compressor 9, as shown in FIG. 16, wherein the heated coolant can then be transferred to an associated site, for use in a laundry, shower, bath facility, steam-driven generator set or absorption chiller etc. The heated water can also be used to supply heated water to containers 17, 19. Note that the heated water in this case can be a key element in recovering the waste heat from the compressor so that the high efficiencies of the combined heat and power (CHP) systems are achieved. Thus a 75% efficient compressor stage can become a 75%+13%=88% efficient.

Compressor 9 is preferably connected to tanks 7a, 7b, 7c and 7d, via one or more pipes 13, through which compressed air generated by compressor 9 can be transferred. A valve 15 is preferably provided along pipe 13 that controls the flow of compressed air from compressor 9 to tanks 7a, 7b, 7c, 7d, while at the same time, mass control valve 16 is preferably provided to close off the flow of air to turbo expander 41. This way, when valve 15 is open, and valve 16 is closed, air will flow from compressor 9 to tanks 7a, 7b, 7c, 7d. On the other hand, when valve 15 is closed, and valve 16 is open, air can flow to turbo expander 41. It should be noted here that while four tanks are shown, any number of tanks can be used, including just one tank or multiple tanks.

Preferably, solar thermal energy receiving panels 5, 6 are provided with first and second containers 17, 19, respectively, associated therewith underneath as shown in FIGS. 4-14. The entire spectrum (ultraviolet, visible and near infrared wavelengths) of solar irradiation is preferably converted to thermal energy by the dimpled cover surface that floats atop the containers of water. Containers 17, 19 are preferably positioned underneath receiving panels 5, 6, and adapted such that the solar thermal energy collected by receiving panels 5, 6 can be used to heat the water contained therein. Although the term water will be used throughout, it should be understood that the term shall include other water-like fluids or liquids that can also be used, such as those that have a high heat capacity with no tendency to introduce bio-fouling or corrosion, and which are able to store heat and rapidly release the heat to the compressed air as it is being stored or expanded.

Figure 3:
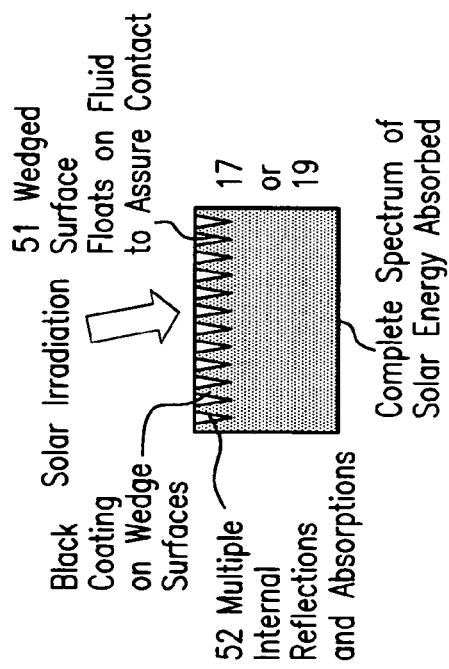
FIG. 3 is a schematic drawing showing a cross section of the wedged surface of the solar receiving panels capable of heating the water contained therein, wherein the wedged surface helps to ensure that most of the solar irradiation is absorbed and proper contact is made between the surface and water contained therein.

Receiving panels 5, 6 are preferably provided with a dimpled solar energy receiving surface 51 with wedged-shaped indentations and black coating, as shown in FIG. 3. Dimpled surface 51 preferably has wedge shaped sections 52 and floats atop the water contained within containers 17, 19 so that direct contact between surface 51, which is exposed to the sun, and water, is ensured, and so that none of the water is allowed to escape as a liquid or vapor. Dimpled surface 51 preferably allows the sun's rays to enter into each wedge shaped section 52 at virtually any angle, wherein the light can be reflected (multiple times) internally and then absorbed by surface 51 to provide heat to the water contained therein. Dimpled surface 51 preferably helps to ensure that a proper amount of incident ultraviolet, visible and infrared solar irradiation is absorbed by panels 5, 6 to generate heat. The deeply corrugated surface as well as the black color preferably captures all the solar wavelengths of the energy emitted by the sun. The black coloring also helps to ensure that the sun's heat is absorbed properly by panels 5, 6.

Containers 17, 19 are preferably connected to and communicate with tanks 7a, 7b, 7c, 7d, via one or more pipes, 21, 22, through which heated water from containers 17, 19 can be transferred to tanks 7a, 7b, 7c, 7d. In one embodiment, a two directional pump 23 is preferably provided to pump water from containers 17, 19 to tanks 7a, 7b, 7c, 7d and vice verse. Preferably, valves 25, 27, are provided on pipes 21, 22, respectively, wherein valve 25 controls the flow of water to and from container 17, and valve 27 controls the flow of water to and from container 19. When valves 25, 27 are both closed, the annuluses 35 in the tanks can be sealed so that water pressure within tanks 7a, 7b, 7c, and 7d can be increased, as will be discussed.

Figure 2:
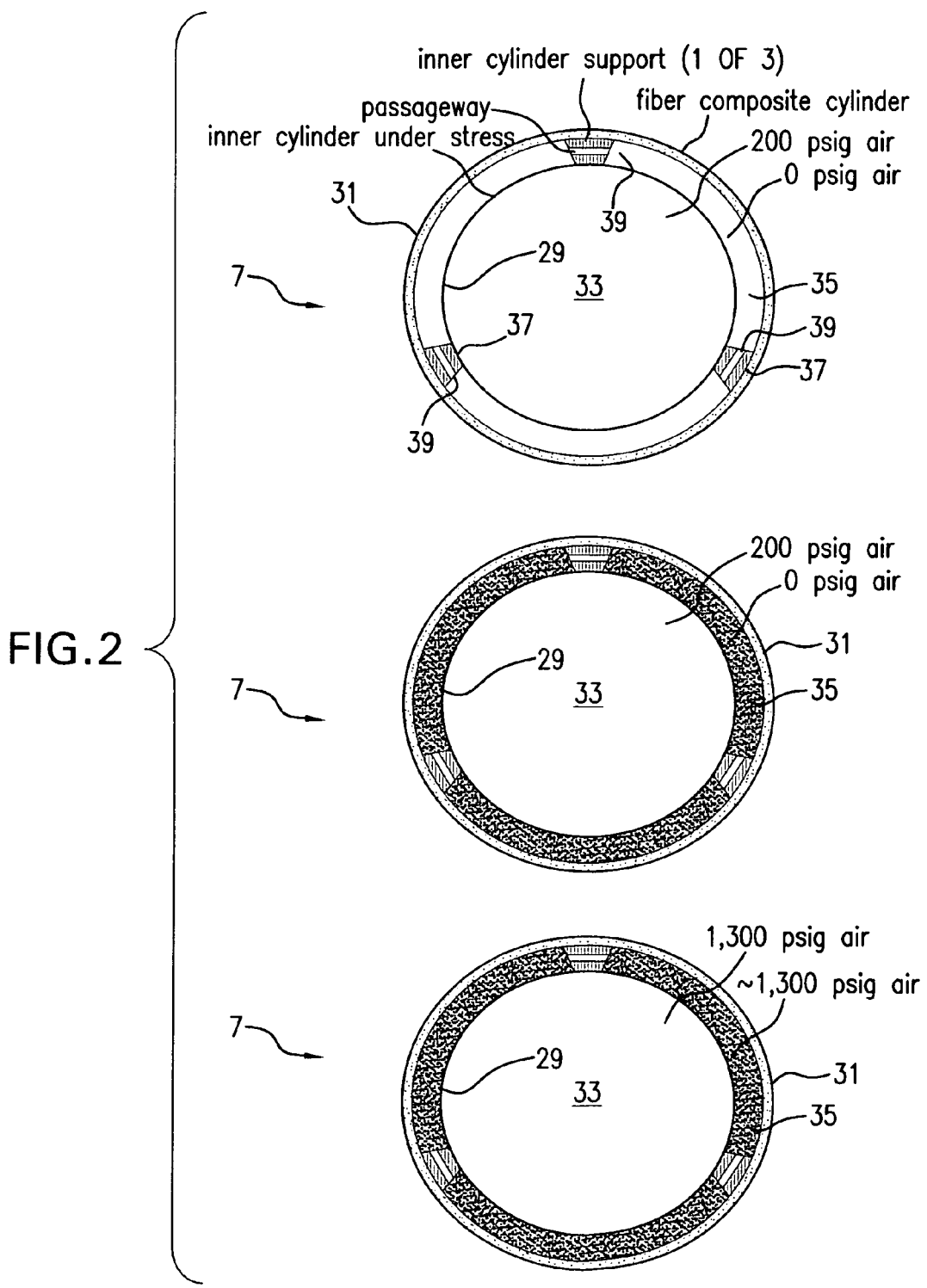
FIG. 2 show cross sections of the high pressure storage tank used in connection with the present system showing the concentrically oriented inner vessel and outer wall, wherein three different pressure states are shown.

As shown in FIG. 2, each tank 7 is preferably configured in the shape of a cylindrical pipe, with an inner wall 29 located concentrically inside an outer wall 31. This arrangement preferably enables one inner pressure vessel and one distinct outer annulus to be formed within each tank, including an inner pressure vessel 33 formed by inner wall 29, and annulus 35 extended between inner wall 29 and outer wall 31. This way, heated water from containers 17, 19 can be transferred to and stored within annulus 35, and compressed air from compressor 9 can be transferred to and stored within pressure vessel 33, wherein the compressed air within pressure vessel 33 can be surrounded by the heated water within annulus 35. Tank 7 can be located above ground, or partially or fully buried. Preferably, annulus 35 has no air pressure and is vented so that as the water fills the annulus, there is no back pressure exerted on pump 23.

Preferably, inner wall 29 is made of a relatively strong and elastic material such as certain types of metal including steel, copper or aluminum to ensure that adequate heat transfer occurs between the heated water within annulus 35 and compressed air within pressure vessel 33. Inner wall 29 is preferably made relatively thin, especially when metals such as stainless steel are used, since stainless steel has relatively low thermal conductive properties when compared to other metals such as copper or aluminum which can also be used.

Thermal Conductivity of Certain Materials

| Material | Btu/(hr ° F. ft) |
|---|---|
| Admiralty Brass | 64 |
| Aluminum | 118 |
| Beryllium | 126 |
| Copper | 223 |
| Tungsten | 97 |
| Stainless Steel | 7 to 26 |

Inner wall 29 is preferably manufactured to withstand a predetermined amount of pressure, which in the preferred embodiment is about 200 psia, although this amount can be higher or lower. At the same time, inner wall 29 is preferably made elastic, which allows inner wall 29 to expand and stretch, such as up to 10% of its elastic limit, such as when air pressures in excess of the predetermined low pressure amount, i.e., 200 psia, is introduced into pressure vessel 33.

Several intermittent supports 37, with a passageway 39 in each one, are preferably provided and secured between inner wall 29 and outer wall 31 to secure inner wall 29 and outer wall 31 together, thereby helping to form a dual pipe-like structure. Passageways 39 are preferably provided within each support 37 to allow water within annulus 35 to pass between the sections formed by supports 37.

Outer wall 31 is preferably made of a strong and durable material, such as fiber reinforced composite materials or pre-stressed concrete, etc., which can withstand the significant air pressures that can be applied against outer wall 31, which in the preferred embodiment, can exceed 1,300 psia, as will be discussed. Outer wall 31 is preferably made relatively thick and has adequate insulating properties (low thermal conductivity).

Common fiber reinforced composites are typically composed of fibers along with a matrix. Fibers are the reinforcement and the main source of strength, while the matrix 'glues' all of the fibers together and transfers stresses between the reinforcing fibers. Sometimes, fillers or modifiers might be added to smooth out the manufacturing process, impart special properties, and/or reduce costs. The composites of interest in connection with the present invention include without limitation: (1) carbon fiber, (2) Polyamide (Aromatic polyamide, Aramid), e.g., Kevlar 29 and Kevlar 49 and (3) Glass (E-glass, S-glass, D-glass). These materials have a combination of strength and insulator properties that are suitable for the outer wall of this application. Another important characteristic of fiber composite materials are their robust performance in humid and corrosive atmospheres.

The outer wall can also be made of inexpensive materials (such as reinforced concrete) that will sustain the internal pressure and mitigate corrosion effects, especially if the pressure vessel (tank or pipeline) is underground. Concrete is less expensive than fiber reinforced composite materials and therefore is the preferred choice. Nevertheless, when concrete is used, it must be pre-stressed to ensure that the proper tension strength can be achieved. Prestressing is a method used to overcome the concrete's natural weakness in tension. It can be used to produce high internal compression forces within the structure of the walls, such that regardless of the tension applied the concrete will be in compression. Prestressing steel tendons (generally high tensile steel cable or rods) are typically used to provide a clamping and therefore compression load that produces an initial compressive stress that offsets the tensile stress that the concrete would otherwise experience due to the outward pressure of the compressed fluid. Prestressing is usually accomplished in three ways: (1) Pre-tensioned concrete, (2) Bonded post-tensioned concrete, or (3) Unbonded post-tensioned concrete.

In one example, the concrete portion of the wall is covered by an outer steel shell that can be shrunk (such as by heat) onto the concrete to compress and strengthen it against tension and therefore higher pressures. Such a pre-stressed concrete pressure tank is shown in U.S. Pat. No. 4,313,902, which is incorporated herein by reference. The pre-stressed concrete pressure-containment vessel is preferably contained by pre-stressing tendons, which apply forces to contain various high pressures within the structure. By permitting and actually inducing controlled cracking of the vessel in the outer portions of the thick shell wall, one embodiment of a pressure-containment vessel relieves stresses and enhances resistance to very high internal pressures and stresses due to high internal temperatures and steep temperature gradients.

Pressure vessels can have end covers which are discussed in U.S. Pat. No. 4,479,336, which is incorporated herein by reference. Such a closure comprises an anchoring ring surrounding the opening of the pre-stressed concrete pressure vessel, a plurality of axial stressing cables and a plurality of cover stressing cables. The cover is separately pre-stressed and simultaneously anchored to the pre-stressed concrete. The anchoring rings on the concrete are used to release the axial stressing cables of the vessel.

The internal pressures considered in connection with the tank are on the order of 1,300 psig. In this respect, a pre-stressed concrete pressure vessel capable of containing extremely high pressures in an internal cavity, such as 10,000 psi and higher, is shown in U.S. Pat. No. 4,389,825, which is incorporated herein by reference. The pressure vessel is constructed in such a way as to enable the application of extremely high circumferential pre-stressing forces at the outer cylindrical surface. The extreme circumferential post-tensioning force, much greater than previously known in pre-stressed concrete pressure vessels, provides for containment of extreme pressures in the internal cavity, using a relatively thin-wall vessel. In order to accommodate high circumferential post-tensioning without structural damage at the interior of the vessel, the vessel preferably includes vertical stress relieving slots extending radially outwardly from the internal cavity surface, effective to lower peak tangential compressive stress at the cavity surface and to relocate peak stress inside the vessel wall where the concrete is confined.

As shown in FIG. 2, tank 7 is preferably placed into one of three different pressure states. The state shown in the top drawing has about 200 psia of air pressure contained within pressure vessel 33, which is preferably the maximum pressure capacity of inner wall 29. At the same time, there is no water and no pressure in annulus 35 at that state. The second state shown in the middle drawing preferably has the same amount of pressure in vessel 33, but water has been introduced into annulus 35, which still has no pressure. The third state shown in the bottom drawing comprises about 1,300 psia of air pressure within vessel 33, which is the maximum capacity of tank 7, and about the same water pressure in annulus 35. Because inner wall 29 is elastic and expands, about the same amount of water pressure is contained within annulus 35 as there is air pressure contained within vessel 33. Note, however, that when the internal air pressure of vessel 33 is 1,300 psia, the tensile resistance in the stretched cylindrical inner wall is preferably able to impose a 200 psid (psi "difference"). Thus outer wall 31 only needs to withstand an equivalent 1,100 psia air pressure, which is a built in safety feature.

As shown in FIG. 1, along pipe 13, a turbo expander device, such as two stage turbo expander 41, is preferably provided which is adapted to release the compressed air stored within tanks 7a, 7b, 7c, 7d, or more specifically, within pressure vessel 33. Turbo expander 41 can be any conventional type designed to expand the compressed air to drive an electrical generator 43, which preferably rotates around shaft 45. This way, as the compressed air is expanded and released, electricity can be generated by generator 43, wherein a power conditioner 44 is preferably provided. At the same time, chilled air produced by turbo expander 41 as a by-product can then be used to provide cooling for associated devices, such as an HVAC, refrigerator, or desalination device, or provide cool inlet air for a fuel driven turbine generator set (GenSet), which further improves the efficiency of the GenSet system.

In this last respect, the present invention preferably incorporates the method and system described in related U.S. Provisional Application Ser. No. 61/195,418, entitled "Method and Apparatus for Using Compressed Air to Increase the Efficiency of a Fuel Driven Turbine Generator," which is incorporated herein by reference. In that patent application, an improved method and system for increasing the efficiency of a fuel driven turbine generator is shown and described, wherein the system preferably uses super chilled air from a turbo expander device and mixes it with ambient air to produce cool inlet air that can be injected into the compressor turbine for more efficient operation thereof. Unlike previous devices for cooling the inlet air, the system utilizes compressed air expanded by a turbo expander to generate the super chilled air, wherein the system produces not only cool air that can be drawn into the fuel driven generator, but "dry" inlet air. And, by removing the moisture from the inlet air using a centrifuge, when the inlet air is accelerated through the nacelle and into the compressor turbine, no ice particles that could damage the turbine blades are formed.

FIG. 17 shows that the required air flow from pressure vessel 33 to drive turbo expander 41 to produce a unit of power is greater when the air temperature of the compressed air is lower, and that concomitantly, less air flow from pressure vessel 33 is needed to drive turbo expander 41 to produce the same unit of power when the temperature of the compressed air is relatively high. What this shows is that when the temperature of the compressed air is kept relatively high, i.e., within pressure vessel 33, more power can be produced using the same amount of air flow when the temperature of the compressed air is higher. For example, if the air temperature of the intake to turbo expander 41 from pressure vessel 33 is 40 degrees F., the pressure vessel 33 would typically exhaust about 10.09 SCFM for every horse power of electrical power (and also a little more than 1 hp of thermal power) used. On the other hand, if the air temperature of the intake to turbo expander 41 from pressure vessel 33 is higher, such as at 160 degrees F., the pressure vessel would typically exhaust only about 8.53 SCFM for every hp of electrical power (and also a little less than 1 hp of thermal power) used. And since less air flow is required in the second instance to produce the same amount of power, more electrical power can then be generated per unit of air flow generated by the system using higher temperature air.

FIG. 18 compares four scenarios of the compressed air energy storage system used herein. The first two scenarios, 1 and 2, show the sensitivities of the compressed air energy storage system to temperature differences of interest. Note that the percentages shown for the over-all system efficiency do not include the beneficial effects of (1) Waste heat recovery from the compressor that can be used by a nearby steam-driven generator set or by a nearby absorption chiller as is done in some Combined Heat and Power (CHP) facilities, and (2) Chilled air from the turbo expander that can be transmitted as intake air to a fuel-driven generator set. These changes will alter the system efficiencies so that 100% would be exceeded, as is the case for the Coefficient of Performance for heat pumps.

In this respect, scenarios 1 and 2 show small differences in overall system efficiency (bottom chart, last column). The motivation for changing from scenario 1 to scenario 2 is the elimination of the need for an expensive thick-walled steel pressure vessel that is replaced by a high technology fiber composite pressure vessel or by a more inexpensive commercial pre-stressed concrete vessel. This strongly influences the initial investment cost for the installation of the system since the pressure vessel is the major cost of the system. Furthermore, the daily use of the sun to provide solar energy will produce more electrical power in scenario 2 than in scenario 1. Scenarios 3 and 4 show that higher temperature air inputs result in higher efficiency of electrical power output, although the super-chilled air used for thermal power is reduced so that the combination of electrical power and thermal power outputs are increased by 6%.

Note the progression of the final exhaust temperatures (minus 175 degrees F. to minus 43.4 degrees F.), the progression of system overall efficiency without HVAC of 34.04% to 59.46%, the progression of system overall efficiency with HVAC of 68.02% to 71.39%, and if the waste heat is recovered from the compressor coolant water there is an additional 15% increase in efficiency.

The value of the thermal chill power is important to emphasize here. For example, if one considers an HVAC application, 1 unit of thermal chill power is achieved by using less than 1 unit of electrical power. This is a simple system to install. On the other hand, if one considers using a MARS 100 GenSet, for example, 1 unit of thermal chill power produces much greater than 1 unit of electrical power. The GenSet is notoriously sensitive to input air temperature, and there is about a 33% increase in electrical power output from the GenSet when the intake air is chilled from 95 degrees F. to minus 22 degrees F. At the same fuel consumption the electrical power would then increase from about 10 MW to about 13 MW. In the Combined Heat and Power (CHP) configuration where the waste heat is recovered, the 3 additional MW are obtained with about 2 MW input.

Preferably, there is a logic monitor and control system 47 associated with system 1, to control the operation of compressor 9 and turbo expander 41, and valves 15, 16, as shown in FIG. 1. In this respect, when the sun is shining, photovoltaic panel 3 is preferably used to drive compressor 9, but when the sun is not shining, or not enough solar energy is available, system 1 preferably has back-up power sources connected to compressor 9, such as energy from the power grid, or utility plant (such as hydro, geothermal or nuclear, etc.). In such case, the present system preferably uses the energy during the low demand periods, such as during the nighttime, so that the rates that are charged can be kept to a minimum. Energy to drive compressor 9 can also come from an associated wind farm or wind turbine which can be operated where and when the wind blows. In such case, the energy used to drive compressor 9 is preferably provided during times when the wind naturally blows at a sufficient and consistent rate, although additional back up power from the grid or power plant would still be needed for periods when neither the sun nor wind is sufficiently available. Control system 47 preferably controls these systems automatically depending on which source is able to provide the energy most efficiently at any given moment in time. The accurate weather forecasting capability available today, for example, can permit useful input to the control system 47 over a two day period.

Control system 47 also preferably controls the release of compressed air through turbo expander 41, via valve 16, wherein valve 15 is required to be closed when valve 16 is open and the compressed air is being released. It also controls the extent to which electricity is generated by generator 43, and conditioned by power conditioner 44, as well as the extent to which chilled air is produced by turbo expander 41, and where the chilled air is distributed to, etc.

Control system 47 is also preferably adapted to control the flow of heated water to and from containers 17, 19, using pump 23 and valves 25, 27, which can also be automatically controlled. For example, when water in container 17 is sufficiently heated by the sun, i.e., it reaches a predetermined temperature, valve 25 can be opened, and valve 27 can be closed, and pump 23 can be used to transfer the heated water from container 17 into tanks 7a, 7b, 7c, and 7d. Then, once the tanks are completely filled, both valves 25, 27 can be closed, such that the annulus in the tanks are sealed to prevent heated water from flowing in the reverse direction. This also allows the water pressure within annulus 35 of tanks 7a, 7b, 7c and 7d, to be increased.

Likewise, when water in container 19 is sufficiently heated by the sun, and ready to be used, valve 27 can be opened, and valve 25 can be closed, and then pump 23 can be used to transfer heated water to and from container 19. Again, once the tanks are completely filled, both valves 25, 27 are preferably closed, such that the water pressure within annulus 35 can be increased at the appropriate time.

It should be noted that an alternate one directional pump 53 or other pump can be used as shown in FIG. 2A which can be used in place of two directional pump 23. Pump 53 is preferably adapted to pump water in one direction only, but the configuration of the pipes and valves preferably allows the water to flow in two directions simply by opening and closing the appropriate valves at the appropriate times. For example, as shown in the top drawing of FIG. 2A, when water is intended to flow in a first direction, i.e., from inlet 58 to outlet 60, valves 55, 61 and 63 are preferably opened, and valves 57 and 59 are preferably closed. This way, when water enters through inlet 58 and travels through pipe 54, it will pass through open valve 55 and into pipe 52, where it can be acted upon by pump 53. Then, as the water is pumped, because valve 61 is open, and valve 59 is closed, water will travel through pipe 56, and because valve 63 is open, and valve 57 closed, the water will eventually flow out outlet 60.

Likewise, as shown in the bottom drawing of FIG. 2A, when water is intended to flow in the opposite direction, i.e., from inlet 60 to outlet 58, valves 55, 61 and 63 are preferably closed, and valves 57 and 59 are preferably opened. This way, when water enters through inlet 60 and travels through open valve 57, it will pass through pipe 52 and into pump 53 because valves 55 and 63 are also closed. Then, because valve 61 is closed, and valve 59 is open, as the water is acted upon by pump 53, the water will travel through pipe 62 toward outlet 58. And because valve 55 is closed, the water will eventually flow out outlet 58.

Figure 4:
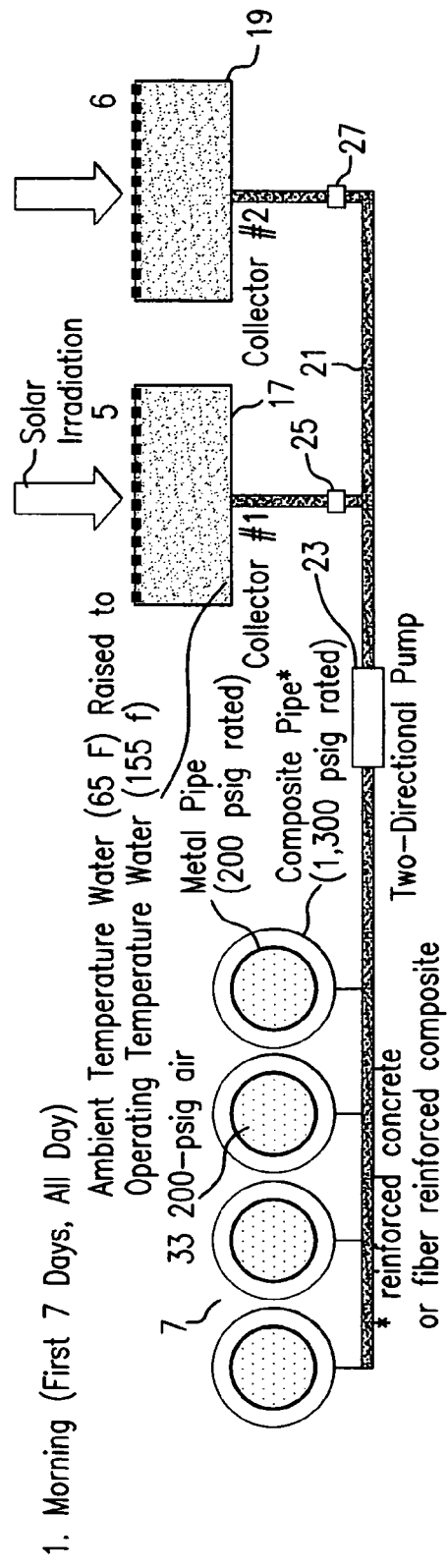
FIG. 4 is a schematic drawing showing the various components of the solar enhancement system of the present invention, including the two solar receiving panels with containers of water and the high pressure storage tanks, wherein the first phase of the process is shown in which the sun is allowed to heat the water within the containers and the air pressure within the tanks is increased to about 200 psia.

The method steps involved using the above components and features will now be discussed in association with FIGS. 4 through 14:

The first phase is shown in FIG. 4 wherein solar receiving panels 5, 6 are initially exposed to the sun's rays during the daytime. This helps to cause the water contained in associated first and second containers 17, 19, respectively, to begin to heat up. This can, for example, go on for several days, or up to a week or more, and preferably, the system is able to collect energy for at least eight hours per day, such as during the morning and early afternoon. The objective in this case is to increase the temperature of the water in containers 17, 19 to a certain degree, which in the preferred embodiment is 165 degrees F. Because two solar receiving panels 5, 6 are used, the water in one of the containers, such as 17, can be heated, while the water in the other container, such as 19, can be used to keep the compressed air warm, and vice verse.

During the same phase, the present method preferably contemplates being able to use the solar energy derived from photovoltaic panel 3 to drive compressor 9, to increase the air pressure within pressure vessel 33 to the predetermined low pressure amount, which in the preferred embodiment is 200 psia. Until water is introduced into annulus 35 and sealed, it is important that air pressure within vessel 33 not be increased to above the low pressure capacity, since that is the capacity of inner wall 29. Note that four tanks are shown in FIGS. 4 to 14; however, for simplicity purposes, this discussion will refer to only a single tank 7. Although there can be more than one storage tank, such as tanks 7a, 7b, 7c and 7d, for convenience, this discussion will refer to only tank 7.

An auxiliary source of energy is preferably available, such as from the power grid, or a nearby utility plant, or wind farm, or wind turbine, to produce compressed air energy when little or no solar energy is available. The system preferably takes that into account by using control system 47 to have the appropriate source connected at the appropriate time. When other sources of energy are used, the appropriate time is when the demands and costs for that source is relatively low, such as during the nighttime hours when the grid or power plant are used, or when the sun shines or the wind naturally blows when those resources are being used.

The second phase is shown in FIG. 5 wherein once the water in first container 17 has reached the predetermined temperature, such as 150 to 165 degrees F., the heated water can then be transferred into annulus 35 of tank 7 by opening valve 25 and keeping valve 27 closed. This can be accomplished during the nighttime, and is preferably done before the morning sun begins to shine so that valve 25 can be closed before compressor 9 begins to increase pressure in pressure vessel 33, as will be discussed. Heated water can be introduced into annulus 35 by shutting valve 27 of second container 19 and opening valve 25 of first container 17, and operating pump 23 which begins pumping water from first container 17 to annulus 35 through pipe 21. Preferably, annulus 35 has no air pressure inside and is vented so that as the water fills annulus 35, there is no back pressure exerted on pump 23. Once annulus 35 is completely filled with water, both valves 25, 27 are preferably closed, to seal off annulus 35 and prevent water from escaping. Air pressure within vessel 33 preferably remains the same throughout the second phase. One way pump 53, as shown in FIG. 2A, along with the associated pipes and valves, can also be used rather than pump 23.

The third phase is shown in FIG. 6 wherein when the sun is shining, such as during the morning hours, photovoltaic panel 3 is preferably used to produce electricity, which in turn can be used to drive compressor 9 to produce compressed air which can be transferred to and stored within vessel 33. Initially, as discussed above, during the first phase, compressor 9 is activated to increase air pressure to the inner wall capacity, which in the preferred embodiment is 200 psia, but once annulus 35 is filled with water, and valves 25, 27 are closed, water pressure within annulus 35 can be increased, and therefore, photovoltaic panel 3 is preferably used again to increase the air pressure within vessel 33 until the maximum amount is reached, which in the preferred embodiment is 1,300 psia.

As discussed above, while inner wall 29 does not have the capacity on its own to withstand the maximum pressure of 1,300 psia, as long as annulus 35 is filled with water, and valves 25, 27 are closed, water pressure within annulus 35 can be increased to help maintain air pressure within vessel 33 at the maximum level.

Again, at any given time, when the sun is not available to drive photovoltaic panel 3, the present method preferably contemplates using an auxiliary source of energy, such as the power grid, or nearby utility plant, or wind farm, or wind turbine, to produce compressed air energy for pressure vessel 33.

The fourth phase is shown in FIG. 7 wherein once tank 7 is filled with compressed air, such as to the maximum degree possible, which in the preferred embodiment is 1,300 psia, the compressed air can be released, such as during the late afternoon hours when energy demand is high, wherein the system can provide backup energy during the peak daytime hours. At this point, the compressed air is preferably at about room temperature, although not necessarily so, and can be released by turbo expander 41, which along with electrical generator 43, and power conditioner 44, produces electricity. At the same time, the heated water in annulus 35 preferably transfers heat to the compressed air within vessel 33 so that excessive temperature drops resulting from air expansion can be avoided. And, as the compressed air is released, the chilled air by-product can be used to drive an associated cooling device, such as an HVAC, refrigerator, or desalination device, or a related fuel driven generator set, as discussed.

The fifth phase is shown in FIG. 8 wherein once the air pressure within pressure vessel 33 is reduced to at or below its capacity, i.e., 200 psia in the preferred embodiment, valve 25 can be opened again to enable the heated water within annulus 35 to be transferred back to first container 17, which preferably occurs before the sun comes up, such that the water can be fully transferred to container 17 before the sun begins to heat the water again. The temperature of the water at this point can be lower than it was before, although not substantially lower, i.e., the temperature could drop from 165 degrees F. to 150 degrees F., for example, as the compressed air is released. Once all the water is transferred, this leaves annulus 35 empty, i.e., at zero psig (14.67 psia), whereas, pressure vessel 33 may still have an air pressure of 200 psia.

The sixth phase is shown in FIG. 9 wherein later that same night the heated water in second container 19 is preferably transferred into annulus 35. This can be done by shutting valve 25 of first container 17 and opening valve 27 of second container 19, and operating pump 23 which pumps the water to annulus 35. This phase is similar to phase two except that heated water from second container 19 is transferred into annulus 35, rather than water from first container 17.

The seventh phase is shown in FIG. 10 wherein when the sun is shining, such as during the morning hours, photovoltaic panel 3 is preferably used again to produce electricity, which in turn, can be used to drive compressor 9, to produce additional compressed air energy, which can be transferred to and stored within vessel 33. This is done once annulus 35 is completely filled, and the valves 25, 27 are closed, which can be done by the next morning, wherein photovoltaic panel 3 can begin operating again to supply electrical energy to compressor 9 and increase air pressure within vessel 33, such as to the maximum amount, which in the preferred embodiment is 1,300 psia. Again, when the sun is not available, the present method preferably contemplates using an auxiliary source, such as the power grid, or utility plant, or wind farm, or wind turbine. This phase is similar to phase three in that the air pressure is increased within vessel 33 to about the same level—the maximum pressure amount.

The eighth phase is shown in FIG. 11 wherein once vessel 33 is filled with air pressure, such as to the maximum degree possible, which in the preferred embodiment is 1,300 psia, the compressed air can be released, such as during the late afternoon hours when energy demand is high. At this point, the compressed air is preferably at about room temperature, although not necessarily so, and can be released by turbo expander 41, which along with electrical generator 43, and power conditioner 44, produces electricity. At the same time, the heated water in annulus 35 preferably transfers heat to the compressed air within vessel 33 so that excessive temperature drops resulting from air expansion can be avoided. This phase is similar to phase four in that the compressed air in vessel 33 is released to about the same extent.

The ninth phase is shown in FIG. 12 wherein once the air pressure within pressure vessel 33 is reduced to at or below its capacity, i.e., 200 psia in the preferred embodiment, valve 27 can be opened again to enable the heated water within annulus 35 to be transferred back to second container 19, which preferably occurs before the sun comes up, such that the water can be fully transferred into container 19 before the sun begins to heat the water again. The temperature of the water at this point can be lower than it was before, although not substantially lower, i.e., the temperature could drop from 165 degrees F. down to 150 degrees F., for example, as the compressed air is released. Once all the water is transferred, this leaves annulus 35 empty, i.e., at zero psig (14.67 psia), whereas, pressure vessel 33 can still have an air pressure of 200 psia. This phase is similar to phase five except that heated water from annulus 35 is returned to second container 19, rather than first container 17.

The tenth phase is shown in FIG. 13 wherein later that same night the heated water in first container 17 is preferably transferred back into annulus 35. As with phase two, this can be done by shutting valve 27 of second container 19 and opening valve 25 of first container 17, and operating pump 23 which pumps the water to annulus 35. Then, once annulus 35 of tank 7 is completely filled again, and valves 25, 27 are closed, which can be done by the next morning, photovoltaic panel 3 can begin operating to supply energy to compressor 9 and compressed air to vessel 33. This phase is similar to phase two, and is also similar to phase six except that heated water from first container 17 is transferred into annulus 35, rather than from second container 19.

The eleventh phase is shown in FIG. 14 wherein when the sun is shining, such as during the morning hours, photovoltaic panel 3 is preferably used again to produce electricity, which in turn, can be used to drive compressor 9, to produce additional compressed air energy, which can then be transferred to and stored within vessel 33. This is done after annulus 35 is completely filled with water, and valves 25, 27 are closed, wherein air pressure within vessel 33 can be increased, such as to the maximum amount, which in the preferred embodiment is 1,300 psia. Again, when the sun is not available, the present method contemplates being able to use an auxiliary source of energy, such as the power grid, or utility plant, or wind farm, or wind turbine. This phase is similar to phase three as well as phase seven in that the air pressure is increased within vessel 33 to about the same extent—the maximum pressure amount. The cycle can then continue.

The following sample scenarios are provided to show how the present system may operate.

In a sample site, there is a proposed 550 MW solar photovoltaic power plant built on 9.5 square miles (25 km$^2$) of ranchland. The system utilizes thin-film photovoltaic panels designed and manufactured by OptiSolar in Hayward and Sacramento Calif. The project delivers approximately 1,100 gigawatt-hours (GW·h) annually of renewable energy.

The proposed solution uses a T-CAES system to support a 33 MW photovoltaic array since this is consistent with the trend for similar solar arrays as shown in FIG. 1. This array has been oversized so there is 20% excess power (or 0.2*33 MW=6.6 MW) that is not immediately used but stored.

The calculations shown in FIG. 19 use scenarios 1 and 2 of FIG. 18 to derive the 3.6 MW (electrical) and 3.00 MW (thermal) requirements as specified in FIGS. 20*a* and 20*b*. FIGS. 20*a* and 20*b* show that a 4 feet diameter and 9,250 ft long pressure vessel may be required for the compressed air in the sample system. The result will permit the generation of 3.6 MW of electrical power with the co-generation of 3.0 MW of super chilled air for HVAC or other ancillary devices (and electrical power savings). FIG. 20A assumes that the single 250 feet long pressure vessel will be replaced by four 2,313 feet long tanks. Therefore a 2,313 feet long and 4 feet wide pipe at 5 (kW-Hrs)/(Sq M)/day will supply 14,664,000 BTU to the 981,240 pounds of water (FIG. 20A). This will result in a 15 degrees F. temperature rise in the water temperature each day and will require 14,718,600 BTU (sufficiently close to the available 14,664,000 BTU available). Five kW-Hr/Sq M/day of sunshine is the average.

FIG. 21 shows the mass of heated water that fills the 0.82 inch annular gap in the tank. There is a low heat transfer coefficient for the air compared to the high heat transfer coefficient (high conductivity of steel and its thin plate) across the steel and the high heat transfer coefficient across the steel and water interface, wherein FIG. 22 displays the resulting temperature profile. The lowest heat transfer coefficient controls the overall heat transfer across the interfaces. FIG. 23 shows the heat transfer coefficient between the compressed air and the thin steel plate backed by the annulus of water. This is based upon the considerations shown in FIG. 22.

Two additional cases were considered with identical pressure vessel lengths and diameters. In one case, the usual thick walled steel tank of the prior art was used that was independent of solar energy input. In the other case, the steel wall was replaced with a water annulus outer wall of composite material as disclosed herein.

Figure 24:
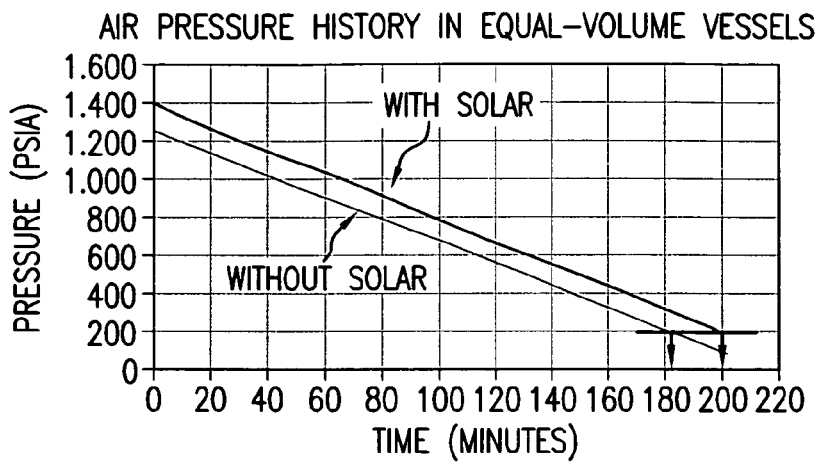
FIG. 24 is a chart showing the air pressure history in the pressure vessel.
Figure 25:
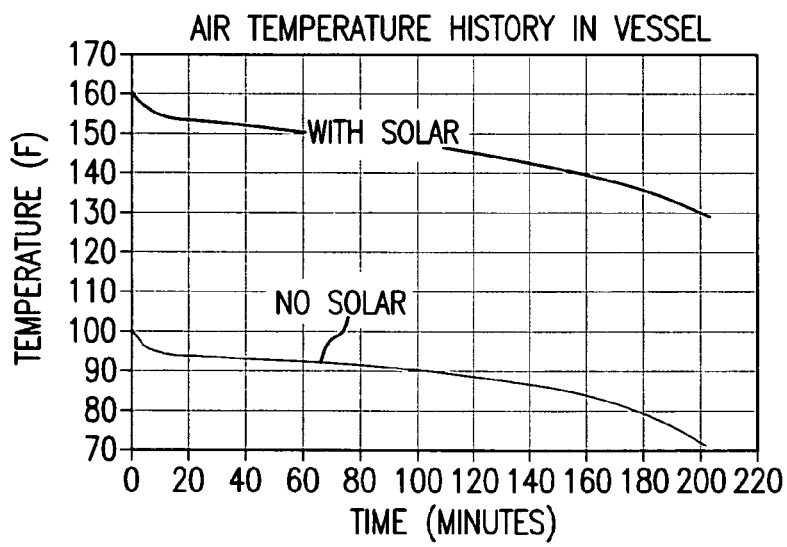
FIG. 25 is a chart showing the air temperature history in the pressure vessel.

FIG. 24 shows that by using the solar energy enhancement method of the present system an increase in pressure can be obtained within pressure vessel 33. Also, an extra 40 minutes (compared to 180 minutes of power discharge time) of 3.6 MW (electrical) was achieved using the solar energy. Likewise, FIG. 25 shows that by using the solar energy enhancement method of the present system an increase in air temperature can be obtained within vessel 33. For example, it can be seen that with the solar enhancement the air temperature remained consistently about 60 degrees F. higher throughout the history of the usage.

Figure 26:
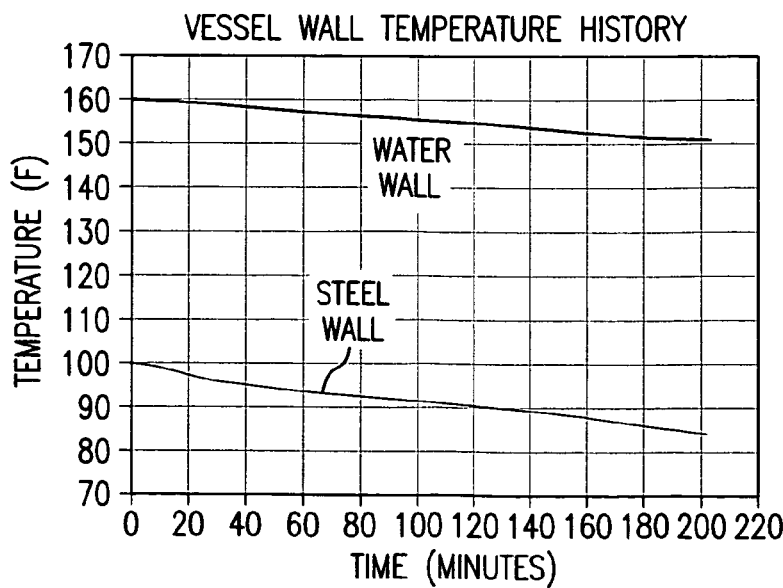
FIG. 26 is a chart comparing the air temperature histories of a steel wall vessel and the water filled annulus of the present invention.

FIG. 26 shows a comparison between using a conventional steel tank in which to store the compressed air (the lower line), and using the water annulus outer walled tank of the present system (the upper line). In the present system, note that the conventional steel wall tank is replaced by a thin walled steel cylindrical inner pressure vessel and a larger diameter thick walled inexpensive reinforced concrete or fiber composite cylindrical outer vessel. The annulus in between these cylinders is filled with water or water-like fluid that has a high heat capacity with no tendency to introduce bio-fouling or corrosion. The water (water-like) fluid is able to store heat and to rapidly release heat to the compressed air within the pressure vessel as it is stored or is expanded. The outermost thick walled cylinder is designed to contain the pressure.

As can be seen, the temperature of the vessel remained consistently higher when using the water annulus tank of the present system, i.e., the temperature remained at least about 60 degrees F. higher throughout the history of the usage than the steel walled standard tank. Moreover, FIG. 25 shows that there was a slight reduction in the rate at which the temperature in the tank decreased. For example, it can be seen that by using the present system, the temperature within pressure vessel 33 dropped from about 160 degrees F. at zero hour to about 152 degrees F. 200 minutes later which is a difference of about 8 degrees F. On the other hand, when using a conventional steel tank, the temperature began at about 100 degrees F. and dropped down to about 86 degrees F., which is a drop of about 14 degrees.

What is claimed is:

1. A solar energy storage and enhancement system comprising:
   a photovoltaic cell panel for collecting energy from the sun;
   at least one compressor capable of being powered by the energy derived from said photovoltaic panel;
   at least one tank having an inner wall and an outer wall, wherein a pressure vessel is formed inside said inner wall, and an annulus is formed between said inner and outer walls, wherein said at least one compressor is adapted to compress air into said pressure vessel,
   at least one solar receiving panel with a container for heating water therein, wherein the water is allowed to communicate between said container and said annulus;
   at least one valve and pump that control the flow of water from said container to said annulus, and vice verse;
   at least one expander for releasing the compressed air within said pressure vessel; and
   a generator for generating electricity as the compressed air is being released.

2. The system of claim 1, wherein said inner wall is located concentrically inside said outer wall, and said outer wall is adapted to be stronger and thicker than said inner wall, wherein said outer wall is designed to withstand the maximum pressure exerted within said tank, and said inner wall is made with relatively high heat transfer properties.

3. The system of claim 2, wherein when said annulus is filled with water and said valve is closed, the amount of pressure that can be maintained within said pressure vessel is substantially determined by the amount of pressure that can be maintained by said outer wall.

4. The system of claim 3, wherein a control mechanism is provided that controls said valve and pump to coordinate the flow of water between said container and said annulus.

5. The system of claim 1, wherein said compressor is also adapted to be powered by at least one other source of energy taken from the group consisting of: the power grid, geothermal plant, nuclear plant, a wind farm, and wind turbine generator.

6. The system of claim 1, wherein the expander comprises a turbo expander that generates chilled air as a by-product, wherein in addition to generating electricity using said generator, the system is adapted to transfer the chilled air exhausted from said turbo expander to provide cooling for an associated device, such as an HVAC, refrigerator or desalination device, or fuel driven generator set.

7. The system of claim 1, wherein the system comprises a fuel-driven generator set capable of using the chilled air downstream of the turbo expander, and/or a combined heat and power system for use of the waste heat generated by the compressor and generator set to enhance overall system efficiency.

8. The system of claim 1, wherein there are at least two solar receiving panels with containers for heating water therein, and each of said receiving panels comprises a wedged surface that floats on the water within said containers, wherein said wedged surface has internal gaps or notches therein that allow the sun's ray to be internally reflected as the sun's rays strike said surface at different angles.

9. The system of claim 1, wherein the photovoltaic panel is large enough to collect solar energy for direct use by the end user, wherein a portion of the energy generated thereby is used to power said compressor.

10. A method of using and storing solar energy and enhancing the efficiency of a compressed air energy storage system, comprising: collecting energy from the sun with at least one photovoltaic panel; powering at least one compressor with the energy derived from said photovoltaic panel as well as at least one other energy source; heating water within containers of at least two solar receiving panels; connecting said at least one compressor to communicate with at least one tank having an inner wall and outer wall concentrically located therein, wherein a pressure vessel is formed within said inner wall for storing compressed air, and an annulus is formed between said inner wall and said outer wall for storing water; increasing the pressure of air within said pressure vessel with said at least one compressor; connecting said containers to communicate with said annulus to allow water from said containers to flow into said annulus, and vice verse; closing said pressure vessel with at least one first valve and closing said annulus with at least one second valve; releasing the compressed air within said pressure vessel through at least one turbo expander and exhausting a chilled air; generating electricity with at least one generator as the compressed air is being released from said pressure vessel through said turbo expander; using the chilled air in at least one of a fuel-driven generator and a combined heat and power system, wherein said combined heat and power system uses waste heat generated by at least one of said at least one compressor and said at least one generator set.

11. The method of claim 10, comprising exposing said solar receiving panels to the sun and collecting solar energy with said solar receiving panels and using the solar energy to heat the water contained within said containers.

12. The method of claim 11, comprising compressing air into said vessel with said at least one compressor, wherein the pressure within said vessel is initially increased up to a predetermined low pressure amount.

13. The method of claim 12, wherein when solar energy is available, the power to operate said at least one compressor is derived from said at least one photovoltaic panel, and when solar energy is not available, the power to operate said at least one compressor can be derived from said at least one other source.

14. The method of claim 13, wherein after the water is heated, the method comprises transferring the heated water from one of said containers into said annulus, and after completely filling up said annulus, closing said second valve to seal said annulus.

15. The method of claim 14, comprising increasing the pressure within said vessel with said at least one compressor, wherein the pressure within said vessel is increased up to a predetermined high pressure amount.

16. The method of claim 15, comprising releasing the compressed air within said pressure vessel using said turbo expander and generating electricity using said generator, wherein the chilled air produced as a by-product can be used in connection with an associated cooling device, such as an HVAC, refrigerator or desalination device, or fuel driven generator set.

17. The method of claim 16, wherein after the pressure within said pressure vessel is reduced to at least said low pressure amount, the method comprises opening said second valve and allowing the water within said annulus to be transferred back into said one of said containers.

18. The method of claim 17, further comprising transferring the heated water from a second of said containers into said annulus, and after filling up said annulus, sealing said annulus, and wherein the method comprises increasing the pressure within said pressure vessel with said at least one compressor, wherein the pressure within said vessel is increased back up to about the predetermined high pressure amount.

19. The method of claim 18, comprising releasing the compressed air within said pressure vessel using said turbo expander and generating electricity using said generator, wherein the chilled air produced as a by-product can be used in connection with an associated cooling device, such as an HVAC, refrigerator or desalination device, or fuel driven generator set.

20. The method of claim 19, wherein after the pressure within said pressure vessel is reduced down to at least about said low pressure amount, the method comprises opening said annulus and allowing the water within said annulus to be transferred back into said second of said containers.

* * * * *